US012244003B2

United States Patent
Zhou et al.

(10) Patent No.: US 12,244,003 B2
(45) Date of Patent: Mar. 4, 2025

(54) LITHIUM TETRABORATE GLASS COATING ON CATHODE MATERIALS FOR IMPROVING SAFETY AND CYCLING STABILITY

(71) Applicant: A123 Systems LLC, Novi, MI (US)

(72) Inventors: Weidong Zhou, Waltham, MA (US); Lixin Wang, Waltham, MA (US); Fu Zhou, South Grafton, MA (US); Derek Johnson, Fort Collins, CO (US)

(73) Assignee: A123 SYSTEMS LLC, Novi, MI (US)

( * ) Notice: Subject to any disclaimer, the term of this patent is extended or adjusted under 35 U.S.C. 154(b) by 1001 days.

(21) Appl. No.: 16/640,711

(22) PCT Filed: Aug. 21, 2018

(86) PCT No.: PCT/US2018/047392
§ 371 (c)(1),
(2) Date: Feb. 20, 2020

(87) PCT Pub. No.: WO2019/040533
PCT Pub. Date: Feb. 28, 2019

(65) Prior Publication Data
US 2020/0185709 A1    Jun. 11, 2020

Related U.S. Application Data

(60) Provisional application No. 62/548,882, filed on Aug. 22, 2017.

(51) Int. Cl.
*H01M 4/36*    (2006.01)
*H01M 4/02*    (2006.01)
(Continued)

(52) U.S. Cl.
CPC ............ *H01M 4/366* (2013.01); *H01M 4/04* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 5,705,291 A | * | 1/1998 | Amatucci | ............ H01M 4/505 |
| | | | | 29/623.5 |
| 2016/0013476 A1 | * | 1/2016 | Oh | ...................... H01M 4/1391 |
| | | | | 427/126.3 |
| 2019/0312279 A1 | * | 10/2019 | Otsuka | .................. H01M 4/525 |

FOREIGN PATENT DOCUMENTS

| CN | 101359736 A | * | 2/2009 | |
| CN | 104218243 A | * | 12/2014 | ........ H01M 10/0525 |

(Continued)

OTHER PUBLICATIONS

Tan, S. et al., "Highly enhanced low temperature discharge capacity of LiNi1/3Co1/3Mn1/3O2 with lithium boron oxide glass modification," vol. 277, 2015, pp. 139-146. (Year: 2015).*

(Continued)

*Primary Examiner* — Robert S Carrico
(74) *Attorney, Agent, or Firm* — McCoy Russell LLP

(57) ABSTRACT

Materials and methods for a coated active electrode material for use in a lithium-ion battery is provided. In one example, a coating for an active electrode material or active electrode material precursor of an electrode of a battery cell may include lithium, boron, and oxygen. In particular, the coating may include lithium tetraborate (LBO), and the coating may
(Continued)

be coated on a lithium insertion electrode active material such as lithium nickel manganese cobalt oxide ($LiNi_xMn_yCo_{1-x-y}O_2$ or NMC).

20 Claims, 15 Drawing Sheets

(51) Int. Cl.
    *H01M 4/04*          (2006.01)
    *H01M 4/505*        (2010.01)
    *H01M 4/525*        (2010.01)
    *H01M 4/62*          (2006.01)
    *H01M 10/0525*     (2010.01)

(52) U.S. Cl.
    CPC .............. *H01M 4/62* (2013.01); *H01M 4/628* (2013.01); *H01M 10/0525* (2013.01); *H01M 2004/028* (2013.01)

(56) References Cited

FOREIGN PATENT DOCUMENTS

| FR | 3019168 A1 | * | 10/2015 | ............. C01B 35/12 |
|---|---|---|---|---|
| JP | 2000077071 A | * | 3/2000 | .......... H01M 10/052 |
| KR | 2013108717 A | * | 10/2013 | |
| KR | 2014025102 A | * | 3/2014 | |
| KR | 20150013077 A | | 2/2015 | |
| KR | 101564131 B1 | | 11/2015 | |

OTHER PUBLICATIONS

Chan, H. et al., "Electrochemical performance of LBO-coated spinel lithium manganese oxide as cathode material for Li-ion battery," Surface & Coatings Technology, vol. 188, No. 1, Nov. 2004, 4 pages.

Choi, S. et al., "Electrochemical Properties of Boron-Doped LiMn2O4 Nanoparticles Covered with Glass Material Prepared by High-Temperature Flame Spray Pyrolysis," International Journal of Electrochemical Science, vol. 8, No. 1, Jan. 2013, 17 pages.

Du, C. et al., "Surface modification of LiNi0.5Mn1.5O4 cathode with lithium boron oxide glass for lithium-ion batteries," RSC Advances, vol. 5, No. 71, Jun. 23, 2015, 8 pages.

ISA Korean Intellectual Property Office of the People's Republic of China, International Search Report and Written Opinion Issued in Application No. PCT/US2018/047392, Dec. 21, 2018, WIPO, 11 pages.

* cited by examiner

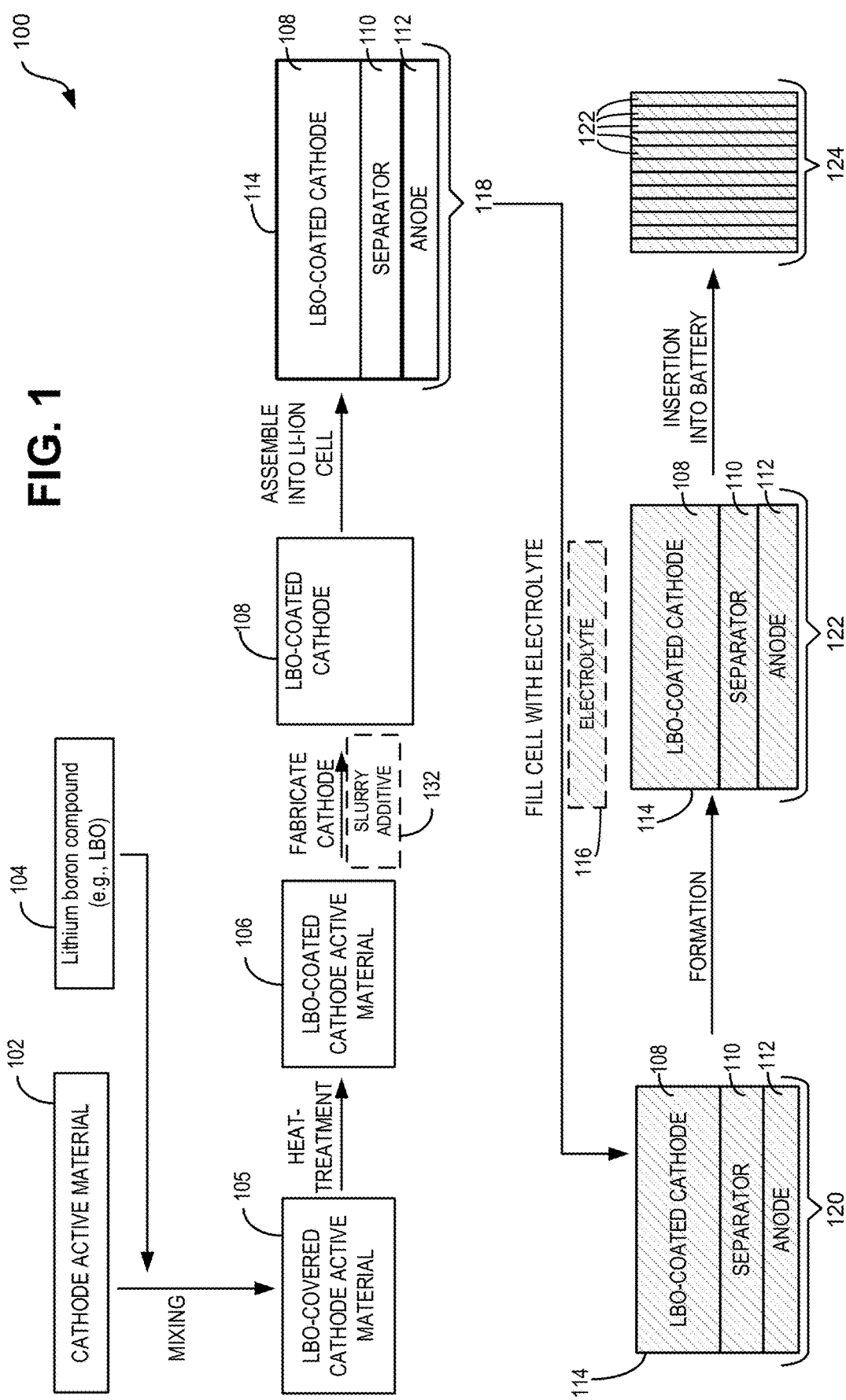

| Sample ID | Coating ratio | Materials used | Mixing method | Sinter temperature (°C) | FCC (mAh/g) | FDC (mAh/g) | Capacity retention at 100 cycle | DSC shifts at delithiated state |
|---|---|---|---|---|---|---|---|---|
| LBO-000 | 0% | Bare NMC | None | 850 | 202.5 | 174.6 | 87% | 0 |
| LBO-001 | 1% | Bare NMC | wet | 460 | 203 | 171.6 | 93% | +23 |
| LBO-002 | 2% | Bare NMC | wet | 460 | 202.1 | 173.7 | 91% | +28 |
| LBO-003 | 1% | Bare NMC | dry | 850 | 192 | 157 | 82% | |
| LBO-004 | 2% | Bare NMC | dry | 850 | 191 | 155 | 81% | |
| LBO-005 | 1% | NMC precursor | dry | 850 | Powder agglomerated heavily during slurry making process | | | |
| LBO-006 | 2% | NMC Precursor | dry | 850 | Powder agglomerated heavily during slurry making process | | | |

FIG. 5

LITHIUM TETRABORATE GLASS COATING ON CATHODE MATERIALS FOR IMPROVING SAFETY AND CYCLING STABILITY

CROSS-REFERENCE TO RELATED APPLICATION

The present application is a United States National Phase Application of International Patent Application Serial No. PCT/US2018/047392 entitled "LITHIUM TETRABORATE GLASS COATING ON CATHODE MATERIALS FOR IMPROVING SAFETY AND CYCLING STABILITY," filed on Aug. 21, 2018. International Patent Application Serial No. PCT/US2018/047392 claims priority to U.S. Provisional Application No. 62/548,882, entitled "LITHIUM TETRABORATE GLASS COATING ON CATHODE MATERIALS FOR IMPROVING SAFETY AND CYCLING STABILITY", and filed on Aug. 22, 2017. The entire contents of the above-listed applications are hereby incorporated by reference for all purposes.

FIELD

This application relates generally to materials and methods for electrodes of high energy density lithium-ion secondary batteries.

BACKGROUND AND SUMMARY

Lithium-ion (Li-ion) batteries are a type of rechargeable battery that store energy from electrochemical reactions. A typical Li-ion battery comprises a plurality of battery cells, each battery cell including a positive electrode (cathode), a negative electrode (anode), an electrolyte solution that transports lithium ions back and forth between the two electrodes, and a porous separator that keeps the anode and cathode electrically isolated. During discharge, lithium ions move through the electrolyte from the anode to the cathode to produce electric current.

In order to meet increasing consumer demand for more energy dense batteries, electrode materials have shifted towards more energy dense active cathode materials with high specific capacities. For example, high nickel active cathode materials such as lithium nickel manganese cobalt oxide ($LiNi_xMn_yCo_{1-x-y}O_2$ or NMC) and lithium nickel cobalt aluminum oxide ($LiNi_xCo_yAl_{1-x-y}O_2$ or NCA) are commonly used as materials for cathodes. These active cathode materials come in powder form, and are typically mixed with a solvent, a conductive additive and a binding agent to form a slurry. This slurry is then coated onto an electrically conductive substrate, such as a metal foil, to form the cathode.

However, high nickel active cathode material powders such as NMC and NCA typically have, for their volume, a larger surface area as compared to other active cathode materials because they comprise secondary particles: agglomerations of chemically bound, nanometer or micrometer sized primary particles. Primary particles, by contrast, are fundamental particles held together by atomic or molecular bonding that can only be separated into smaller particles by the application of ultrahigh energy. The primary particles of high nickel active cathode material powders bind together in an irregular, non-uniform manner when forming these secondary particles, leaving open pores and gaps in the resulting secondary particles. Because of their secondary particles' high porosity—and therefore high surface area to volume ratio—high nickel active cathode material powders have more interfacing contact with the electrolyte per unit volume than other active cathode material powders such as single crystal cathode materials having no secondary particle and no particle pore. Due to the increased contact area between the cathode and electrolyte of high nickel cathodes, cathodes including high nickel active cathode material powders will more quickly catalyze the decomposition of the electrolyte, which results in reduced electrochemical cycling performance and diminished coulombic efficiency (discharge capacity divided by the charge capacity during a given charge/discharge cycle) of the battery cell. Additionally, the decomposition of organic electrolyte and subsequent gas production lowers the flash point of the electrolyte, reducing the safety of the battery and increasing the risk of fire.

Thus, in order to improve the safety of NMC, NCA or other cathode materials, the large interface between the cathode materials and the electrolyte is minimized by, for example, applying a coating to the cathode materials to prevent electrolyte decomposition. However, such coatings must also be conductive enough to lithium ions to still enable their efficient transport between the electrolyte and the cathode. That is, the coatings must not interfere with or hamper lithium ion transport between the electrolyte and the cathode active cathode material, or else they risk comprising the discharge rate performance of the battery. Accordingly, before mixing with the slurry, the active cathode material powders are typically coated with coatings comprising relatively electrochemically stable or inert material that still facilitates lithium-ion and electronic transport. For example, inorganic oxide particles such as $Al_2O_3$, $SiO_2$, and $TiO_2$ are typically used as coating materials on the active cathode materials.

However, the inventors herein have recognized potential issues with the above inorganic oxide particle coatings for high nickel active cathode material powders. As one example, the inorganic oxide particles are not entirely effective because they do not sufficiently cover the entire interface area between the secondary particles of the cathode active materials and the electrolyte. That is, such inorganic oxide coatings do not sufficiently restrict electrolyte decomposition by the cathode because the inorganic oxide particles do not fill the pores of the secondary particles and do not form a continuous coating around the entire surface of the secondary particles of the active cathode material. In particular, when mixing the coating material with the cathode material, the inorganic oxide coating material may not deposit continuously and/or evenly over the porous and irregularly shaped surface of the secondary particles of the cathode active material because both the oxide particles and the active cathode material are dry crystalline powders. Due to their crystalline structure, the grain boundary resistance between the cathode materials and the inorganic oxide coating materials is very high. This high grain boundary resistance between the coating and the cathode material inhibits even and continuous spreading of the nano-particles over the surface of the cathode active materials. Thus, these discontinuous inorganic oxide particle coatings still expose portions of the active cathode material powders to the electrolyte, thereby allowing the very electrolyte decomposition that they aim to prevent.

As another example, the inorganic oxide particle coatings are expensive. The cost of coating the high nickel active cathode material powders with such inorganic oxide particles is particularly high because the inorganic oxide particles must be ground until they are uniform, and mixed in a high energy mixer with the cathode material powders.

As yet another example, coating the high nickel active cathode material powders by mixing them with the inorganic oxide nano-particle powders increases environmental hazards because such mixing contributes to dust pollution of air, and preparation of such inorganic oxide particles requires excessive grinding to make the particles sufficiently uniform for mixing, adding to dust generation. Bulk nano-particle powders may have low bulk densities less than 0.1 g/cm$^3$, and as a result, may readily float through the air of manufacturing and laboratory spaces and increase cost to control dust pollution.

In one example, the issues described above may be at least partially addressed by a coating or coating precursor for an active electrode material, such as an active cathode material, of an electrode of a battery cell comprising lithium, boron, and oxygen. For example, the coating or coating precursor may comprise lithium tetraborate (LBO). In some examples, the lithium tetraborate coating continuously coats the entire surface of secondary particles of the active electrode material, and fills in pores of the secondary particles. In some examples, the lithium tetraborate coating comprises 0.01 to 100 wt % of $Li_aX_bB_cO_d$, wherein X is one or more of Al, Ti, Ca, Si, W, and Nb, and wherein $0 \le a \le 10$, $0 \le b \le 10$, $0 \le c \le 10$, and $0 \le d \le 10$, or another lithium metal borate compound. In some examples, the compound $Li_aX_bB_cO_d$ may comprise LBO comprising deposits of oxides of aluminum, titanium, calcium, silicon, tungsten, and/or niobium.

In another example, a coated electrochemically active cathode powder may comprise a coating, the coating comprising a lithium and boron containing compound. For example, the lithium and boron containing compound may comprise lithium tetraborate (LBO). In one example, the lithium and boron containing compound may comprise 0.01 to 100 wt % of $Li_aX_bB_cO_d$, wherein X is one or more of Al, Ti, Ca, Si, W, and Nb, and wherein $0 \le a \le 10$, $0 \le b \le 10$, $0 \le c \le 10$, and $0 \le d \le 10$, or another lithium metal borate compound. In some examples, the compound $Li_aX_bB_cO_d$ may comprise LBO comprising deposits of oxides of aluminum, titanium, calcium, silicon, tungsten, and/or niobium.

In another example, a method may comprise: dissolving a coating for an electrochemically active cathode material in a solvent to form a coating solution; mixing the coating solution with the electrochemically active cathode material. In some examples the coating solution and electrochemically active cathode material may be sintered or otherwise processed. For example, the solution and active cathode material may be agitated or mixed with an additive. In some examples, the coating solvent may comprise water, and/or the coating may comprise water-soluble lithium tetraborate (LBO). In some examples, the solvent may comprise water, and/or the coating may comprise 0.01 to 100 wt % water-soluble $Li_aX_bB_cO_d$, wherein X is one or more of Al, Ti, Ca, Si, W, and Nb, and wherein $0 \le a \le 10$, $0 \le b \le 10$, $0 \le c \le 10$, and $0 \le d \le 10$, or another lithium metal borate compound. In some examples, the compound $Li_aX_bB_cO_d$ may comprise LBO comprising deposits of oxides of aluminum, titanium, calcium, silicon, tungsten, and/or niobium.

By utilizing lithium and boron containing compounds such as LBO to coat active cathode materials, the safety and cycling stability of lithium-ion batteries including these active cathode materials may be increased without sacrificing discharge rate performance. In particular, the cycling stability of a battery cell may be increased relative to battery cells including inorganic oxide powders as coatings for active cathode materials because the lithium and boron coatings reduce decomposition of the electrolyte by the active cathode material as compared to the inorganic oxide coatings. Because of their lower grain boundary resistance, as compared to inorganic oxides, the lithium and boron containing compounds more continuously and evenly coat the surface of secondary particles of the active cathode materials, thereby reducing the interface between them and the electrolyte. Further, the lithium and boron containing compounds can be dissolved in a solution so that they are more evenly and homogenously deposited on the surface of the secondary particles of the active cathode materials during mixing, and prior to sintering. Because the LBO coating also forms a more stable SEI layer on the surface of the active cathode material (by interacting with the products of electrolyte decomposition), the decomposition of the electrolyte is further reduced, thereby further improving cycling performance of the battery cell.

Further, the safety of a battery cell may be increased because the LBO coating increases the flash point of the electrolyte. In particular, because the LBO coating minimizes electrolyte decomposition by reducing the interface between the cathode active material and the electrolyte, gas production that results from this decomposition, which would otherwise lower the flash point of the electrolyte, is minimized.

Further, the cost of manufacturing and coating such active cathode materials is reduced because the LBO can be dissolved in water; it does not need to be ground as evenly as the inorganic oxide nano-particles, and does not require the high energy mixers that the inorganic oxide nano-particles require to mix with the active cathode materials.

Dust generation and environmental waste are also reduced by utilizing LBO as the coating for the active cathode material instead of inorganic oxides. This is because the LBO, when dissolved in a solution, produces far less dust than the grinding required to make the inorganic oxide nano-particles ready for mixing with the active cathode materials, and the actual mixing techniques required to mix the inorganic oxide nano-particles with the active cathode materials.

The above benefits may be achieved without sacrificing the C-rate performance of the battery because LBO and other lithium boron containing compounds do not inhibit lithium-ion transport when applied as coatings, and generally still facilitate such lithium-ion transport to the same or higher degree as uncoated active cathode materials.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIG. 1 shows a schematic of an example method for manufacturing a lithium-ion battery comprising a cathode coated with lithium tetraborate (LBO), in accordance with at least one embodiment of the present disclosure.

FIG. 3A also shows a more magnified version of the SEM image, illustrating the porous surface of the secondary particles of the example un-coated NMC sample.

FIG. 5 shows a table reporting the test results for the measured cycling stability of lithium-ion battery cells comprising electrochemically active cathode materials with varying amounts by mass of LBO coatings, in accordance with at least one embodiment of the present disclosure.

DETAILED DESCRIPTION

Figure 2A:
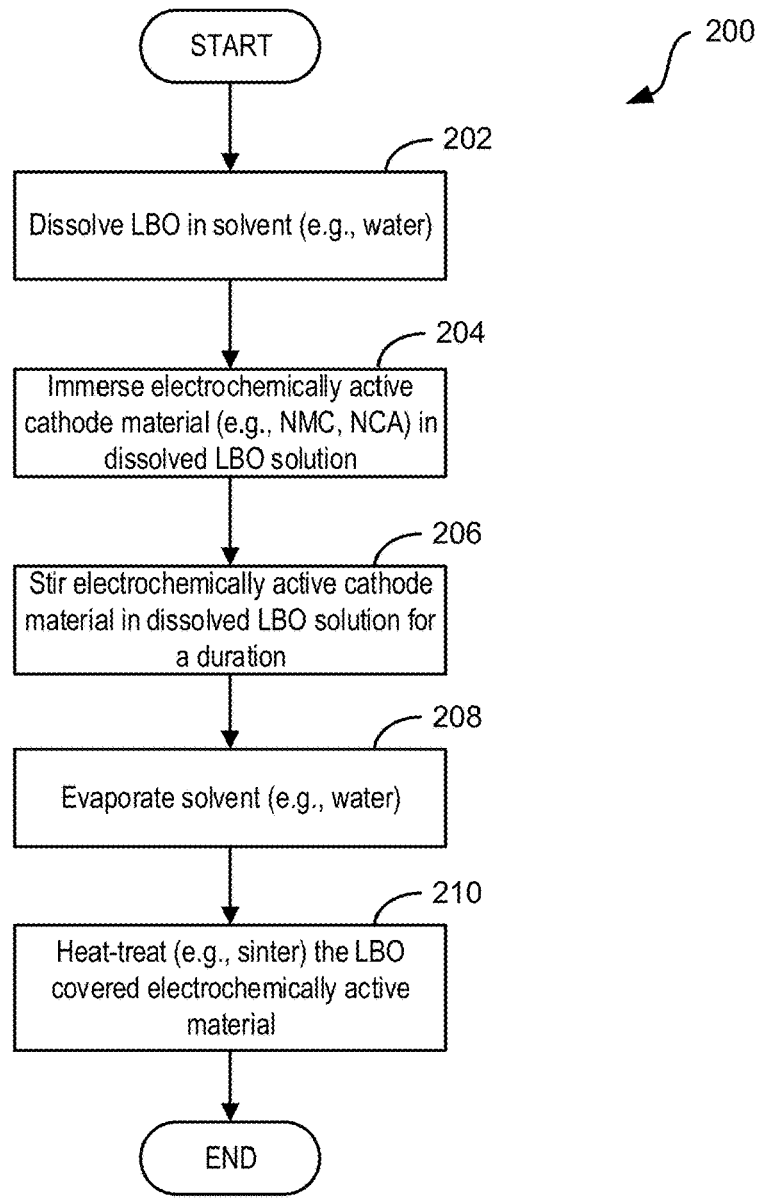
FIG. 2A shows a flow chart of an example method for coating an electrochemically active cathode material of a cathode, such as the cathode of the lithium-ion battery of FIG. 1, with LBO by immersing the electrochemically active cathode material in an aqueous solution containing dissolved LBO, in accordance with at least one embodiment of the present disclosure.

The present disclosure relates to materials and methods for coating an electrochemically active cathode material, such as NMC, with lithium tetraborate ($Li_2B_4O_7$ or LBO) or other types of compounds containing lithium and borate. LBO-coated electrochemically active cathode material may be used in the cathodes of battery cells for lithium-ion batteries. The electrochemically active cathode material may be in the form of a powder and may comprise porous secondary particles as shown in the example SEM image of sample NMC in FIG. 3A, and the schematic of an example secondary particle shown in FIG. 4A. This cathode powder may be mixed with LBO to form a cathode of a lithium-ion battery as described in FIG. 1. The cathode powder may be wet mixed with an aqueous solution containing dissolved LBO as shown in the example method of FIG. 2A, or it may be dry mixed with solid LBO powder as shown in the example method of FIG. 2B. The coating may then be formed by heat-treating (e.g., sintering) the LBO-covered cathode powder. Upon heat-treatment, the LBO coating forms a continuous and/or uniform coating on the entire surface of the secondary particles of the cathode material as shown in the examples of FIGS. 3B and 4B. In some embodiments, the LBO coating is held to the surface of the NMC powder by the heat applied by sintering. Alternatively, the coating may be formed without heat-treating the LBO-covered cathode powder. For example, when the cathode powder and LBO powder are wet mixed or dry mixed, in some examples, the resulting LBO-coated cathode powder may be used without undergoing sintering.

Through experimentation and testing, the LBO-coated cathode materials have proven to provide increased safety and cycling stability relative to conventional inorganic oxide coatings, such as $Al_2O_3$, $SiO_2$, and $TiO_2$, while retaining substantially the same discharge rate performance of the aforementioned inorganic oxide coatings. For example, FIGS. 5, and 7-9 show results for tests run on battery cells comprising varying amounts of LBO as coatings for NMC cathodes. As shown in the example table of FIG. 5 and example graphs of FIGS. 7-8, battery cells comprising the LBO-coated cathode materials have a higher capacity retention after numerous charge/discharge cycles than battery cells comprising un-coated cathode materials. Thus, the LBO serves to prevent decomposition of the electrolyte and does not negatively impact the functioning of the cathode, nor does it substantially reduce the ease at which lithium ions move between the cathode and the electrolyte. Further, in some embodiments, the LBO coatings do not dope, protrude into, or penetrate the crystalline structure of the electrochemically active cathode materials, and do not chemically react with the electrochemically active cathode materials as evidenced in the example XRD patterns of FIGS. 6A-6B. In some embodiments, however, doping may occur. For example, in some embodiments, boron from the LBO coating may dope the NMC powder. In some embodiments, doping may occur and the dopant may penetrate only from 0 to 30% of the distance from the surface of the NMC particles to the center of the particles.

The LBO-coated cathode materials also show increased safety when incorporated into the cathodes of lithium-ion battery cells. In particular, coating the electrochemically active cathode material with LBO increases the flash point of the battery cells by minimizing the cathode's catalysis of electrolyte decomposition. Additionally, as shown in the example DSC curve of FIG. 9, the heat release temperature for cathodes containing the LBO-coated NMC cathodes is significantly higher than for cathodes containing un-coated NMC.

For purposes of clarity and continuity, it should be appreciated that in the following description, multiple different names may be used to refer to the same concept, idea, or item, and vice versa. For example, it should be understood that "high nickel active cathode materials" may be used herein to refer to all electrochemically active cathode powders used in lithium-ion batteries including, but not limited to, an active cathode material for a lithium insertion cathode, such as lithium nickel manganese cobalt oxide (NMC or $LiNi_xMn_yCO_{1-x-y}A_zO_2$ where A may be Al, Zr, Mg, Sc, Fe, or F, $0.1 \leq x \leq 0.9$, $0.001 \leq z \leq 0.05$), lithium nickel cobalt aluminum oxide ($LiNi_xCo_yAl_{1-x-y}O_2$ or $LiNi_xCo_yAl_{1-x-y}A_zO_2$ where A may be Zr, Mg, Sc, Fe, or F, $0.1 \leq x \leq 0.9$, $0.001 \leq z \leq 0.05$), $LiMn_xNi_{2-x}O_4$, and $LiNiPO_4$, $LiCoPO_4$, lithium nickel manganese (both layered and spinel structure) or any of their precursors such as $Ni_xMn_yCo_{1-x-y}(OH)_2$ and $Ni_xCo_yAl_{1-x-y}(OH)_2$. Further, "high nickel cathodes" may be used to refer to all cathodes that are constructed from, include, and/or use the aforementioned high nickel active cathode materials for lithium-ion transport between the cathode and the electrolyte of a battery cell. Thus, a cathode referred to as a "NMC cathode" is a cathode that comprises NMC as an electrochemically active cathode material, for example.

Additionally, although the present disclosure relates specifically to lithium tetraborate (LBO) as a coating for these electrochemically active cathode materials, it should be appreciated that other compounds including lithium and borate may be used as coating materials, as well as other types of amorphous and/or water soluble glasses, boron salts, etc., without departing from the scope of the present disclosure. The coating materials may also be insoluble in water and/or other solvents. Thus, it should be appreciated that the amorphous glass may be soluble, such as water soluble, or in other examples, may be insoluble, in water or other solvents. In addition, these coating materials may comprise deposits of non-amorphous lithium and boron containing compounds. For example, the coating for the active cathode material may comprise one or more of lithium metaborate, lithium multiborate, and lithium ortho-borate, and/or it may comprise 0.01 to 100 wt % of $Li_aX_bB_cO_d$ wherein X is one or more of Al, Ti, Ca, Si, W, and Nb, wherein $0 \leq a \leq 10$, $0 \leq b \leq 10$, $0 \leq c \leq 10$, and $0 \leq d \leq 10$, and a, b, c and d are chosen to provide an electroneutral compound, or another lithium metal borate compound, without departing from the scope of the present disclosure. In some examples, the compound $Li_aX_bB_cO_d$ may comprise LBO comprising deposits of oxides of aluminum, titanium, calcium, silicon, tungsten, and/or niobium. In some examples, the compound $Li_aX_bB_cO_d$ may comprise LBO and $0 < b \leq 10$, or $0.01 \leq b \leq 10$, or $0.1 \leq b \leq 10$, or $1 \leq b \leq 10$, or $0 < b \leq 4$, or $0 < b \leq 2$, or $0 < b \leq 1$, or $0 < b \leq 0.1$, or $0 < b \leq 0.01$.

Additionally in the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, components, and/or groups, but do not preclude the presence or addition of one or more other features, regions, integers, steps, operations, elements, components, and/or groups thereof. The term "or a combination thereof" or "a mixture of" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Turning to FIG. 1, it shows a schematic 100 of an example process for fabricating an LBO-coated electrochemically active cathode material, and for fabricating a lithium-ion battery utilizing the LBO-coated cathode material.

The electrochemically active cathode material 102, or cathode active material 102, may first be mixed with a lithium boron compound 104. The lithium boron compound 104 is a compound comprising lithium and boron. In a preferred embodiment, this compound may comprise lithium tetraborate ($Li_2B_4O_7$ or LBO). As such, lithium boron compound 104 may also be referred to as LBO 104 in the description herein. However, in other embodiments, the lithium boron compound 104 may comprise another type of amorphous glass, a boron salt, an LBO precursor, lithium metaborate, lithium multi borate, lithium ortho-borate, and lithium fluoride mixed LBO. In some embodiments, the lithium boron compound 104 may comprise 0.01-100% by weight of $Li_aX_bB_cO_d$, wherein X is one or more of Al, Ti, Ca, Si, W, and Nb, and wherein $0 \leq a \leq 10$, $0 \leq b \leq 10$, $0 \leq c \leq 10$, and $0 \leq d \leq 10$, or another lithium metal borate compound. In some examples, the compound $Li_aX_bB_cO_d$ may comprise LBO comprising deposits of oxides of aluminum, titanium, calcium, silicon, tungsten, and/or niobium.

As described in greater detail below with reference to FIGS. 2A and 2B, the mixing may comprise dry mixing the LBO 104 and cathode active material 102 and/or wet mixing the LBO 104 and cathode active material 102 by dissolving the LBO in water to form an aqueous mixture.

In some examples, the lithium fluoride mixed LBO glass coatings may comprise a ternary mixture of lithium oxide ($Li_2O$), lithium borate or lithium tetraborate, and lithium fluoride (LiF). As an example, the presence of fluoride or fluoride ion in the glass coating may serve a first purpose of providing improved acid corrosion resistance beyond what may be capable with non-fluoride containing LBO formulations, and a second purpose of enhancing the lithium ion conductivity within the glass coating. In some examples, NMC cathode materials may be coated with ceramic materials containing fluoride ions (e.g. LiF and $AlF_3$) and may be resistant to corrosion arising from the presence of hydrofluoric acid (HF).

In other examples, lithium fluoride mixed LBO glass may provide a modified atomic-level ordering due to the presence of the fluoride anion. In an example, the modified ordering may provide a reduced glass transition temperature for fluoride-containing glass, compared with non-fluoride-containing glass, which may result in higher Li-ion conductivities and may allow higher power densities.

In some examples, the electrochemically active cathode material 102 may comprise one or more of NMC, NCA, spinel and layered structure $LiMn_xNi_{2-x}O_4$ and/or any one or more of their precursors such as $Ni_xMn_yCo_{1-x-y}(OH)_2$. Thus, the cathode active material 102 may be present in a form ready for fabrication into a cathode. For example, the cathode active material 102 may be primarily comprised of secondary particles and may comprise few, if any, loose primary particles that are not part of larger secondary particles. Primary particles of the cathode active material 102 may be roughly 1 μm or less in diameter, whereas secondary particles of the cathode active material 102 may be greater than 1 μm diameter, and may increase in size up to many tens of microns in diameter (as shown in greater detail below with reference to the SEM images of an NMC sample in FIGS. 3A and 3B). Example secondary particles of an NMC cathode material are described in greater detail below with reference to FIGS. 3A and 3B. In some examples, the cathode active material 102 may comprise more than one type of material (e.g., may not be pure), and may comprise a combination of different high nickel electrochemically active cathode materials. Additionally or alternatively, the cathode active material 102 may be heat-treated prior to mixing with the LBO 104.

The mixing of the LBO 104 and cathode active material 102 may result in a LBO-covered cathode active material 105. In some embodiments, to produce the final coating, the LBO-covered cathode active material 105 may then be heat-treated. In particular, the LBO-covered cathode active material 105 may be sintered to produce a LBO-coated cathode active material 106. The LBO-coated cathode active material 106 comprises a continuous and/or non-continuous surface coating of LBO over the entire surface of the primary and secondary particles of the cathode active material 106. The continuous and/or non-continuous surface coating having a uniform and/or non-uniform thickness over the entire surface of the primary and secondary particles of the cathode active material 106. In an example, a first primary and/or secondary particle may comprise a continuous surface coating of LBO while a second primary and/or secondary particle may comprise a non-continuous surface coating of LBO. In another example, the first and the second primary and/or secondary particles may also comprise either a uniform thickness coating of LBO or a non-uniform thickness coating of LBO. In some embodiments, the LBO coating is held to the surface of the particles of the cathode active material in response to the heat from the sintering process. In some embodiments, the heat-treatment step is not performed and the LBO-covered cathode active material 105 is used in place of LBO-coated cathode active material 106.

In the example where the cathode active material 102 is mixed with the aqueous LBO solution, the LBO covered cathode active material 105 may first be heated to evaporate the water, prior to initiating the sintering. In an example, the coated electrochemically active cathode powder may include a coating (i.e. LBO coating) which is 0.1-20.0% of the coated electrochemically active cathode powder by weight. In other examples, the coated electrochemically active cathode powder may include a coating (i.e. LBO coating) which is 0.1-10% or 0.1-3.0% of the coated electrochemically active cathode powder by weight.

After sintering, the LBO-covered cathode active material 106 may then be fabricated into a cathode 108 comprising the LBO-covered cathode active material 106. Prior to fabricating the cathode 108, the LBO-covered cathode active material 106 may be pre-mixed with one or more conductive additives. LBO-covered cathode active material 106 may also be pre-mixed, prior to fabricating cathode 108, with one or more non-coated electrochemically active cathode materials including, but not limited to, an active cathode material for a lithium insertion cathode, such as lithium iron phosphates, lithium vanadium iron phosphates, and lithium manganese oxides. Fabricating the cathode 108 may comprise mixing the LBO-covered cathode active material 106 into a slurry, coating the slurry onto a conductive substrate, drying the slurry-coated conductive substrate, compressing the coating, and calendering. For example, the LBO-covered cathode active material 106 may be mixed with one or more slurry additives 132 to form the slurry. In particular, the slurry additives 132 may comprise one or more solvents and/or bindings agents such as a polymeric binder. As another example, the LBO-covered cathode active material 106 may be mixed with a binder and at least one additive in a solvent to form the slurry. The slurry containing the LBO-covered cathode active material 106 may then be coated onto a conductive substrate (also referred to herein as a "current collector"), such as a metal foil (e.g., aluminum foil), which may then be dried, pressed, and calendered to form the LBO-covered cathode 108.

The cathode 108 comprising the LBO-covered cathode active material 106 may then be fabricated into a Li-ion cell 118, by assembling the cathode 108 with an anode 112, separated by an electrically isolating separator 110. The anode 112 may comprise one or more of carbon/graphite, lithium titanate, and/or silicon containing anode materials.

The separator 110 serves to separate the anode 112 and the cathode 108 so as to avoid their physical contact. In a preferred embodiment, the separator 110 has high porosity, excellent stability against the electrolytic solution, and excellent liquid holding properties. Example materials for the separator 110 may be selected from nonwoven fabric or porous film made of polyolefins, such as polyethylene and polypropylene, or ceramic-coated materials.

The Li-ion cell 118 may then be filled with electrolyte 116 (indicated by the hashed lines in FIG. 1), to produce a filled Li-ion cell 120. The Li-ion cell 118 may further comprise a housing 114, such as a pouch, that houses the anode 112, cathode 108, separator 110, and electrolyte 116. The housing 114 may be sealed when finishing the cell 118 so that the electrolyte 116 is contained within the housing 114.

The electrolyte 116 is in intimate contact with the components in the Li-ion cell 120, as illustrated. The electrolyte 116 may comprise Li salt, organic solvents, such as organic carbonates, and additives. The electrolyte 116 is present throughout the Li-ion cell and in physical contact with the anode 112, cathode 108, and separator 110.

The filled Li-ion cell 120 may then undergo cell formation, referred to also as a first charge/discharge cycle, to form Li-ion cell 122. Li-ion cell 122 may be a fully fabricated and complete battery cell that is ready for insertion or use in a Li-ion battery 124 in conjunction with other similarly finished Li-ion cells.

During cell formation, the electrolyte 116 reacts with the cathode 108 comprising the LBO-coated active material and may form a solid electrolyte interface (SEI) layer. Because of the electron deficiency associated with the boron in the LBO, the LBO coating may also create a more stable SEI layer by bonding more strongly to electrolyte decomposition products (e.g., products of electrolyte decomposition catalyzed by the cathode materials) than would other inorganic oxide nano-particle coatings. The more stable SEI layer created by the LBO coating may further minimize the interactive interface area between the cathode materials and the liquid electrolyte, thereby further improving cycling performance.

Further, during cell formation reactions, for example additive reactions, may occur. In some embodiments, the Li-ion cell 120, 122 may be kept at room temperature during cell formation. For example, the cell may be kept at room temperature such as 20° C. or between 16° C. to 25° C. Alternatively, in some examples, some temperature controls maybe used or may be applied over time. For example, the cell formation reaction may be performed between 16° C. to 100° C.

One or a plurality of formed Li-ion cells 122 may be inserted into, or used as, a Li-ion battery 124. Although the Li-ion battery 124 shown in FIG. 1 comprises 12 Li-ion cells 122, the battery 124 may comprise more or less than 12 cells 122. As non-limiting examples, the battery 124 may comprise 6 or 14 Li-ion cells 122, or another quantity. The cells 122 may be arranged in various configurations comprising parallel and series connections to provide pre-determined voltages and currents.

In this way, a lithium-ion battery 124 may be fabricated wherein an LBO-coated cathode active material 106 is used to prepare at least one cathode 108 of the battery cells 122 of the lithium-ion battery 124. In particular, the lithium-ion battery 124 may include one or more battery cells 122, wherein one or more of the battery cells 122 include the cathode 108 containing the LBO-coated cathode active material, a separator 110, an electrolyte 116, and an anode 112. The LBO-coated cathode active material 106 may be prepared by first mixing the LBO 104 and cathode active material 102, and then sintering the resulting mixture 105. In some embodiments, the coating is held to the surface of the cathode active material through sintering. In some embodiments, sintering may not take place and mixture 105 of LBO 104 and cathode active material 102 may be used in place of sintered active material 106. FIGS. 2A and 2B, described below, provide two methods for coating the cathode active material with LBO.

Figure 2B:
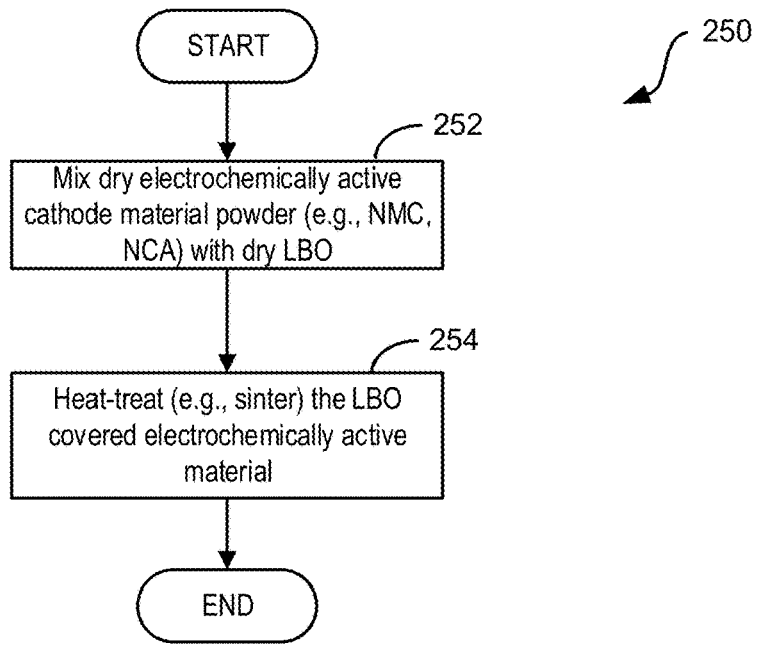
FIG. 2B shows a flow chart of another example method for coating an electrochemically active cathode material of a cathode, such as the cathode of the lithium-ion battery of FIG. 1, with LBO by mixing the electrochemically active cathode material with dry LBO, in accordance with at least one embodiment of the present disclosure.

Turning now to FIGS. 2A and 2B, they show flow charts of example methods, 200 and 250 respectively, for coating electrochemically active cathode materials, such as high nickel active cathode materials (e.g., NMC, NCA, any one or more of their precursors, and $LiMn_xNi_{2-x}O_4$), with LBO. It should be appreciated that additional or alternative coatings to LBO may be used, such as lithium metaborate, lithium multiborate, lithium ortho-borate, or $Li_aX_bB_cO_d$, wherein X is one or more of Al, Ti, Ca, Si, W, and Nb, and wherein $0 \leq a \leq 10$, $0 \leq b \leq 10$, $0 \leq c \leq 10$, and $0 \leq d \leq 10$, and a, b, c and d are chosen to provide an electroneutral compound, or another lithium metal borate compound. In one example, the coating may be 0.01 to 100%, or 0.5 to 90%, or 0.5 to 80%, or 0.5 to 40%, or 0.5 to 20%, or 0.5 to 10%, or 0.5 to 5%, or 1 to 4% of $Li_aX_bB_cO_d$, wherein X is one or more of Al, Ti, Ca, Si, W, and Nb, and wherein $0 \leq a \leq 10$, $0 \leq b \leq 10$, $0 \leq c \leq 10$, and $0 \leq d \leq 10$, and a, b, c and d are chosen to provide an electroneutral compound, or another lithium metal borate compound. In some examples, the compound $Li_aX_bB_cO_d$ may comprise LBO comprising deposits of oxides of aluminum, titanium, calcium, silicon, tungsten, and/or niobium. In one example, the compound $Li_aX_bB_cO_d$ may comprise LBO and $0 < b \leq 10$, or $0.01 \leq b \leq 10$, or $0.1 \leq b \leq 10$, or $1 \leq b \leq 10$, or $0 < b \leq 4$, or $0 < b \leq 2$, or $0 < b \leq 1$, or $0 < b \leq 0.1$, or $0 < b \leq 0.01$. In some examples, a, b, and c may be selected with d balancing the selections of a, b, and c.

The electrochemically active cathode materials may also be referred to herein as "cathode powders" for the sake of brevity since the cathode materials are preferably in powder form. In particular, methods 200 and 250 disclose different ways to mix the cathode powders with LBO. Method 200 discloses a wet method for mixing the LBO and cathode powders by dissolving the LBO in water and immersing the cathode powders in the aqueous mixture containing the dissolved LBO. Method 250 discloses dry mixing LBO powder with the cathode powder using a planetary mixer, auto-grinder, or other mixing method.

Focusing first on FIG. 2A, method 200 begins at 202 which comprises dissolving LBO in a solvent (e.g., water). Since LBO is water soluble, dissolving the LBO may be achieved by only including water as the solvent. However, other solvents may be used in the alternative to, or in addition to, water. As an example, a weight percentage of LBO dissolved in water may be 0.1 wt %-20.0 wt %. In another example, a weight percentage of LBO dissolved in water may be 0.1 wt %-10.0 wt %. In another example, a weight percentage of LBO dissolved in water may be 0.1 wt %-3.0 wt %. Thus, method 200 at 202 comprises forming a dissolved LBO solution by dissolving the LBO in water or another solvent. In other examples, an organic coating process may be used to coat the active cathode material. In one example, a suspension of LBO in ethanol may be prepared so the electrochemically active cathode material may be immersed in the LBO/ethanol suspension.

Electrochemically active cathode material may then be immersed in the dissolved LBO solution at 204. In particular, the electrochemically active cathode material may be mixed with the dissolved LBO in a specific weight ratio to the LBO. For example, the percent by mass of LBO may be 0.1-20% or 0.1-10% or 0.1-6% of the total weight of both the LBO and the cathode material. In a preferred embodiment, the percent by mass of LBO relative to the total weight of both the LBO and the cathode material may be between 1-2%.

Immersing the active cathode material in the LBO solution may comprise exposing the cathode active material to the LBO solution. The active cathode material may be either partially or wholly submerged in the dissolved LBO solution. In some examples, method 200 may continue to 206, which comprises stirring the cathode powder and LBO solution for a duration. The duration may comprise a pre-set amount of time, and/or may be adjusted based on measured operating parameters. In particular, the cathode powder may be stirred in the LBO solution for approximately 2 hours or between 1 minute and 10 hours. Thus, the active cathode material may be immersed and/or stirred in the LBO solution for a duration until the LBO is evenly deposited on the surface of the active cathode material.

After exposing the active cathode material to the LBO for the duration, method 200 may then continue from 206 to 208, which comprises evaporating the water or other solvents. This may be accomplished by, for example, heating the LBO solution containing the active cathode material to the boiling point of the water or other solvents until substantially all of the liquid has been evaporated. For example, the LBO solution can be heated in a range of temperatures between 60-100° C.

Method 200 may then continue from 208 to 210 after the liquid has been evaporated from the LBO-covered cathode material. At 210, method 200 comprises heat-treating (e.g., sintering) the LBO-covered electrochemically active cathode material to help the LBO adhere more to the cathode material and create an interface between the LBO and the cathode materials. In some examples, method 200 may comprise sintering the LBO-covered cathode material to approximately 500° C. However, in other examples, the sintering temperature may range anywhere between 25 and 950° C. In some embodiments, the sintering temperature may range from 150 to 950° C., or 200-950° C. In some examples, the sintering temperature may be kept constant for the duration of the sintering process, and in other examples, it may be varied throughout the process. For example, to help the LBO adhere better to the cathode materials the sintering temperature may be adjusted to adjust the interface between the coating and the NMC particles (both primary and secondary). The sintering may be performed for a duration. In some examples, the duration may be a pre-set duration of approximately 2 hours or between a range of 10 minutes and 10 hours. However, in other examples, the duration may be adjusted based on measured operating parameters. In some examples, the LBO-covered cathode material may be subjected to pre-sintering for a pre-set duration at a lower temperature than the sintering temperature. In some examples, pre-sintering temperature may range anywhere between room temperature and 750° C. In some embodiments, pre-sintering temperature may range anywhere from 150 and 750° C. Method 200 then ends. In some embodiments, the LBO-coating is held to the surface of the NMC particles without the heat from the sintering process. In some embodiments, step 210 is not included in method 200 and method 200 ends at step 208.

Turning now to FIG. 2B, it shows method 250 for dry mixing the LBO and the active cathode powder. Method 250 begins at 252, which comprises dry mixing the cathode power with dry LBO. In some examples, the mixing may be performed by using a planetary mixer, auto-grinder, or other type of mixer to homogenously mix the LBO and cathode powder and cover the cathode powder in the LBO.

In particular, the electrochemically active cathode material may be mixed with the dry LBO in a specific weight ratio. For example, the percent by mass of LBO may be 0.1-20% or 0.1-10% or 0.1-6% of the total weight of both the LBO and the cathode material. In a preferred embodiment, the percent by mass of LBO relative to the total weight of both the LBO and the cathode material may be between 1-2%. Method 250 then continues to 254 which comprises sintering the LBO-covered cathode powder in the same or similar manner as described above at 210 of FIG. 2A. Method 200 then ends. In some embodiments, the LBO-coating is held to the surface of the NMC particles without the heat from the sintering process. In some embodiments, step 254 is not included in method 250 and method 250 ends at step 252.

Figure 3A:
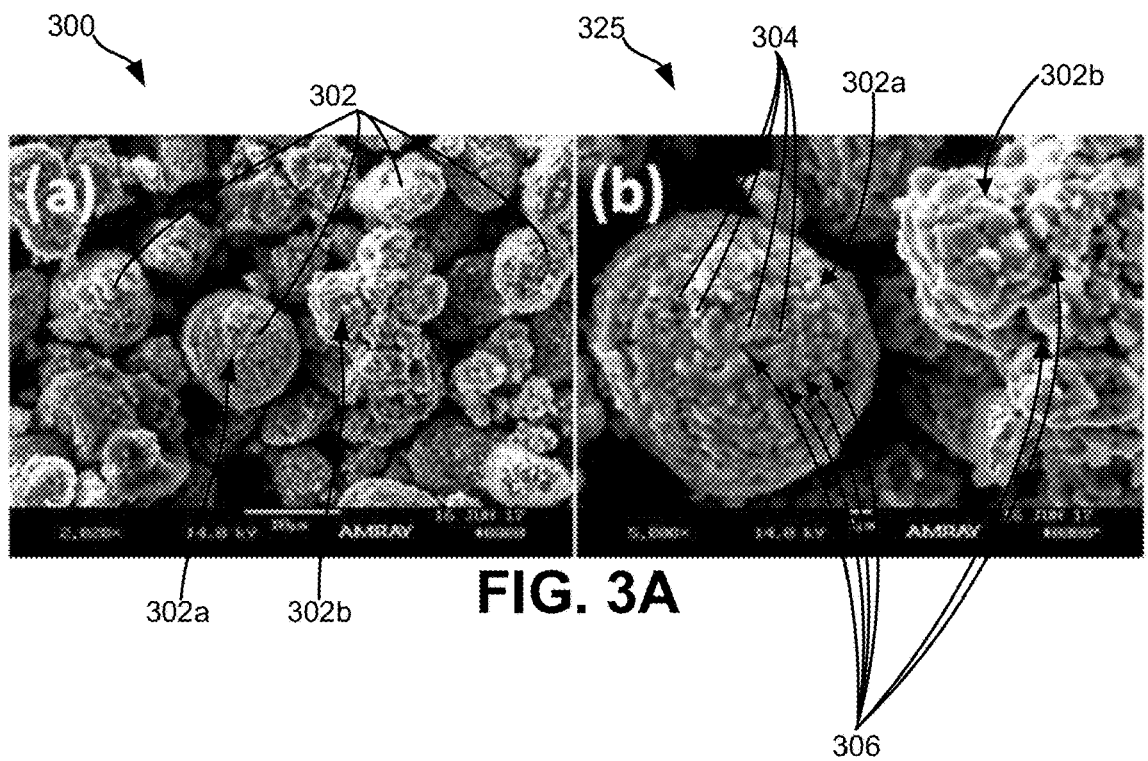
FIG. 3A shows a scanning electron microscope (SEM) image of an example NMC sample comprising a plurality of un-coated secondary particles.
Figure 3B:
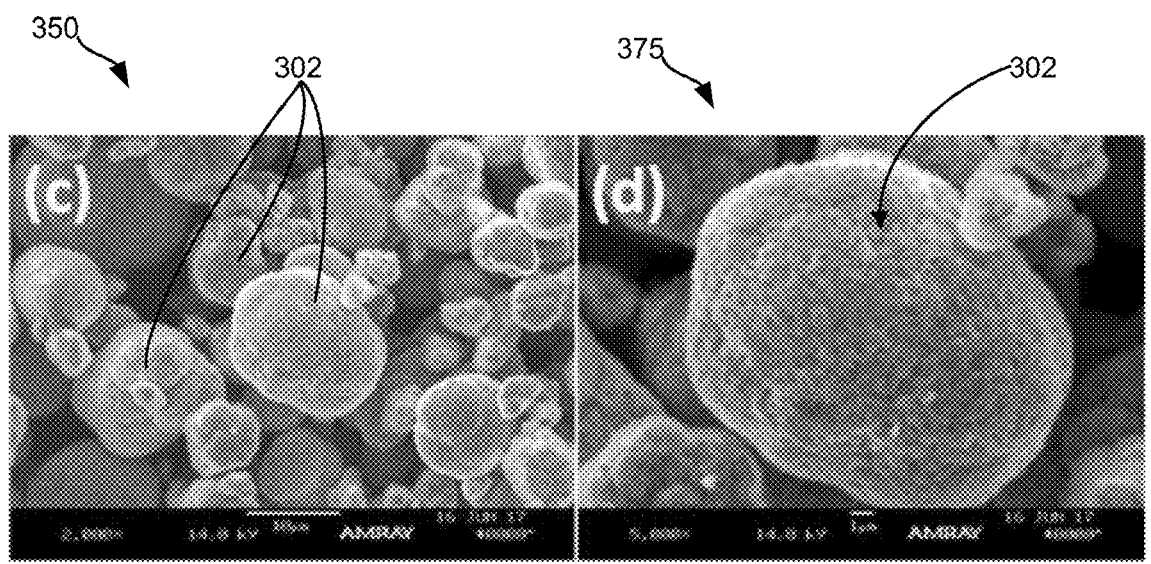
FIG. 3B shows SEM images of an example LBO-coated NMC sample, indicating an ambiguous surface of the secondary particles of the example NMC sample, in accordance with at least one embodiment of the present disclosure.

Moving on to FIGS. 3A and 3B, they show SEM images of example NMC cathode materials. FIG. 3A shows un-coated NMC particles under two different magnifications (first SEM image 300 under a lower magnification, and second SEM image 325 under a higher magnification), and FIG. 3B shows the NMC particles coated with LBO in accordance with the coating methods described above with reference to FIGS. 1-2B under two different magnifications (first SEM image 350 under a lower magnification, and second SEM image 375 under a higher magnification). As can be seen in FIGS. 3A and 3B, the NMC samples comprise a plurality of secondary particles 302, each of the secondary particles 302 comprising a plurality of primary particles 304. As can be seen in the un-coated NMC particles of FIG. 3A, the surfaces of the secondary particles 302 are irregular and contain many pores 306 (black dots on the secondary particles 302). The pores 306 are gaps between adjacent primary particles 304 of the secondary particles 302.

In the first SEM image 300, on the left of FIG. 3A, two secondary particles 302a and 302b are labelled because these same particles are shown in the more magnified second SEM image 325 to the right of FIG. 3B. Thus, the image on the right in FIG. 3A (325) is a more magnified version of the SEM image on the left (300). The second SEM image 325 FIG. 3A illustrates in more detail the irregularly shaped surface of the secondary particles 302 comprising the pores 306. Inorganic oxide nano-particles are unable to deposit into these pores, and thus are unable to continuously coat the surface of a porous material like NMC.

However, as shown in FIG. 3B, LBO can deposit in the pores 306 of the secondary particles 302 and continuously and uniformly coat the surface of the secondary particles 302. FIG. 3B shows a 2% by weight mixture of LBO (2% LBO and 98% NMC by weight mixture), which has been coated on NMC according to one or more of the methods described above with reference to FIGS. 1-2B. Thus, as shown in FIG. 3B, by utilizing LBO and one or more of the coating methods described above with reference to FIGS. 1-2B, the entire surface of the secondary particles 302 of the NMC is coated with a continuous and/or uniform layer of LBO. Further, the LBO fills in the pores 306 as evidenced by the smoother surface of the secondary particles 302 in FIG. 3B relative to the surfaces of the uncoated secondary particles of FIG. 3A. Thus, in FIG. 3B the pores 306 are difficult to even make out because the LBO has so evenly and continuously filled the pores 306.

Figure 4A:
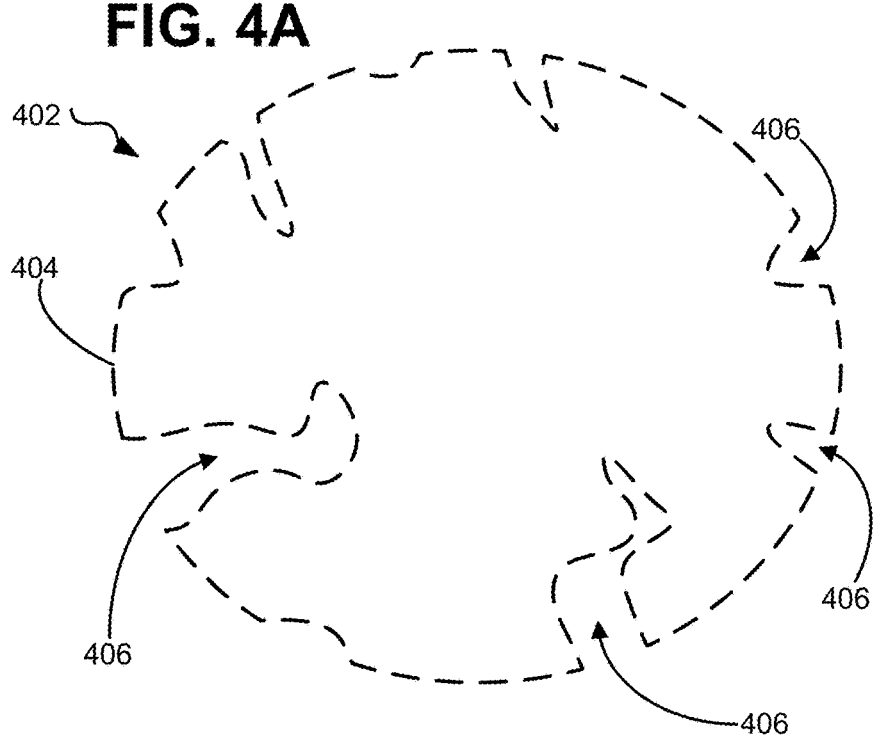
FIG. 4A shows a schematic of a cross-section of an example secondary particle of an electrochemically active cathode material that is not coated.
Figure 4B:
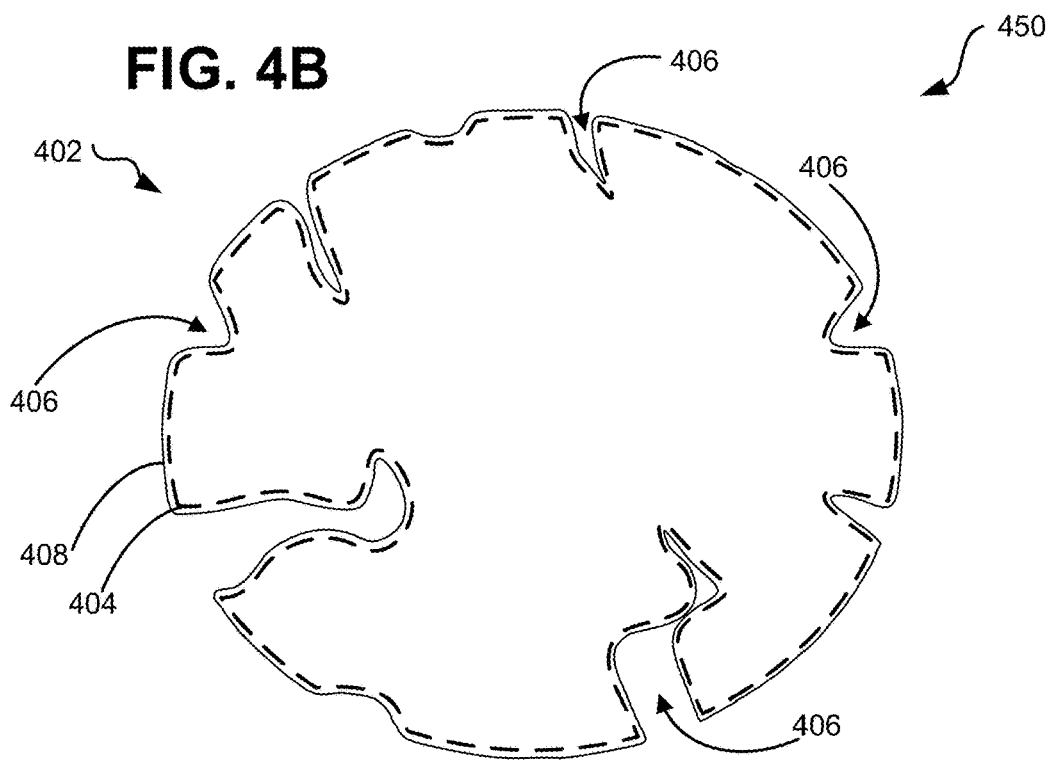
FIG. 4B shows the example secondary particle of FIG. 4A after it has been coated with LBO in accordance with at least one of the coating methods described in the present disclosure.

Continuing to FIGS. 4A and 4B, they show schematics of cross-sections of example secondary particles of cathode active materials, such as the NMC sample described above in FIGS. 3A and 3B. FIG. 4A shows a schematic 400 of a cross-section an example secondary particle 402 of a cathode active material that is not coated. FIG. 4B shows a schematic 450 of the same cross-section of secondary particle 402 after it has been coated with LBO in accordance with one or more of the coating methods described above in FIGS. 1-2B. Similar to FIGS. 3A and 3B, it is important to note that the LBO coating 408 extends around the entire surface 404 of the secondary particle 402. Thus, the coating 408 is continuous as is shown by the representative solid line in FIG. 4B. Further, the coating 408 extends into pores 406 of the secondary particle 402, and does not discontinue at any portion of the surface 404 of the secondary particle 402. Further, the coating 408 may be substantially uniform such that it is approximately the same thickness around the entirety of the surface 404 of the secondary particle 402.

Moving on to FIGS. 5-9 they show test data and results from experimental testing of NMC cathode materials that have been coated with LBO in accordance with one or more of the coating methods described herein (e.g., methods described above in FIGS. 1-2B) and from battery cells fabricated with cathodes incorporating the LBO-coated NMC cathode materials as their active materials. In particular, the FIGS. 5 and 7-9 show test data and results for battery cells that include cathodes containing the LBO-coated NMC as their electrochemically active cathode material. FIGS. 6A-6C show test data and results for NMC cathode materials coated with varying amounts of LBO, in accordance with one or more of the coating methods described herein.

Figure 6A:
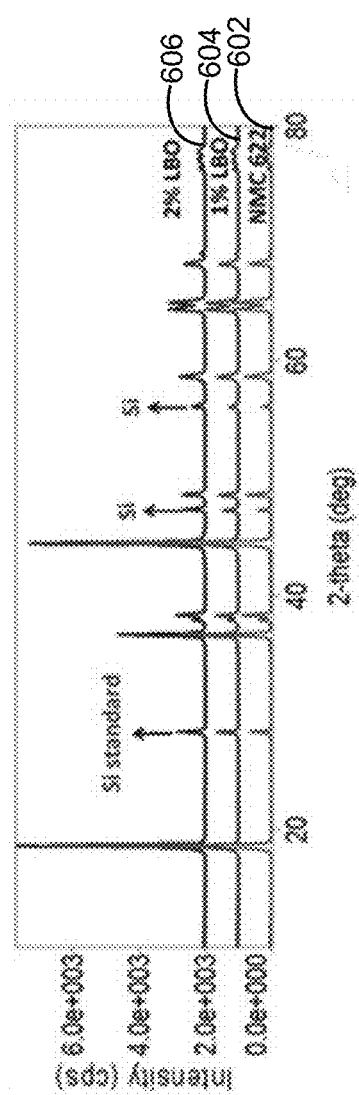
FIG. 6A shows a graph depicting X-Ray Diffraction (XRD) patterns from example NMC samples having varying amounts by mass of LBO coatings and sintered at 460° C., in accordance with at least one embodiment of the present disclosure.
Figure 6B:
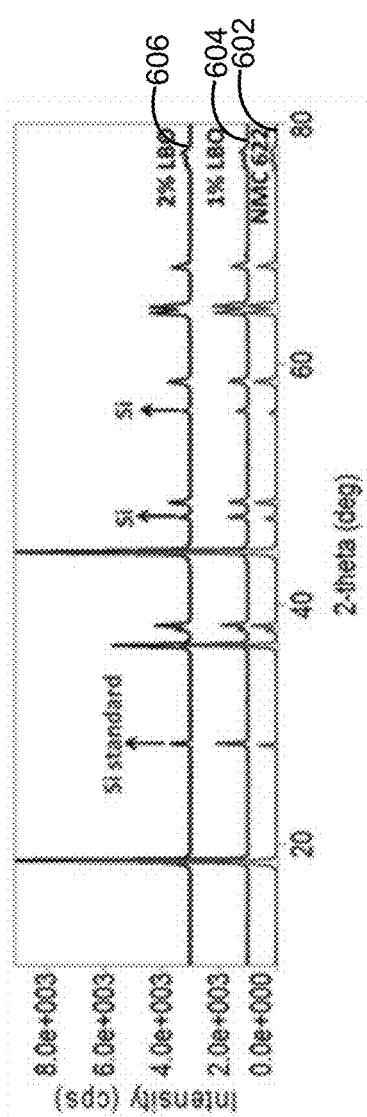
FIG. 6B shows a graph depicting X-Ray Diffraction (XRD) patterns from example NMC samples having varying amounts by mass of LBO coatings and sintered at 850° C., in accordance with at least one embodiment of the present disclosure.
Figure 6C:
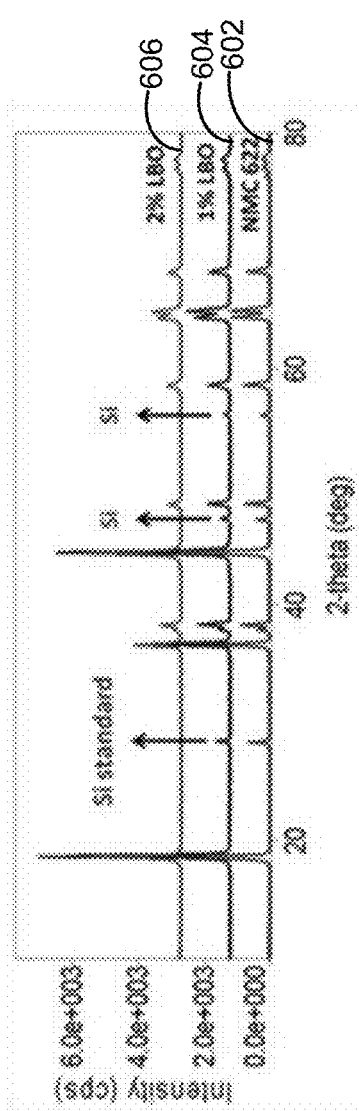
FIG. 6C shows a graph depicting X-Ray Diffraction (XRD) patterns from example precursor NMC samples having varying amounts by mass of LBO coatings and sintered at 850° C., in accordance with at least one embodiment of the present disclosure.

The results reported in FIGS. 5 and 7-9 come from tests of battery cells that were fabricated in accordance with one or more of the methods described above in FIGS. 1-2B. The test results reported in FIG. 9 may come from half cells including only a cathode and electrolyte coupled to a lithium source such as, for example, an anode comprising lithium metal. Further, these tested battery cells, the test results of which are shown in FIGS. 5 and 7-9, may comprise cathodes comprising the LBO-coated NMC, made into a slurry and then coated onto a metal foil, dried, and calendered in accordance with one or more of the methods described above in FIGS. 1-2B. The test results in FIGS. 5 and 7-9 therefore show how varying sinter temperature and weight ratio of LBO to NMC may affect the performance, cycling stability, and safety of battery cells comprising the LBO-coated NMC powder. FIGS. 6A-6C shows different XRD patterns for the NMC powders containing varying amounts of LBO and sintered at varying temperatures.

Focusing on FIG. 5, it shows a table 500 summarizing the test results shown below in FIGS. 6-9. In particular, table 500 summarizes how sinter temperature, amount of LBO used for the coating, and mixing method (dry or wet) may affect the first charge capacity (FCC), first discharge capacity (FDC), capacity retention, and cathode heat release temperature of battery cells comprising LBO-coated NMC active cathode material. In the description herein, the "capacity" may refer to the coulometric capacity or total Amp-hours available when a battery or battery cell is discharged at a given discharge current. The coating ratio is the weight ratio (in percent) of LBO used relative to the total weight of the LBO-coated NMC (weight of the NMC+the weight of the LBO coating). The dry mixing method is the same or similar to the dry mixing method described above with reference to FIG. 2B, and the wet mixing method is the same or similar to the wet mixing method described above with reference to FIG. 3A. Further, the capacity retention at 100 cycles is the proportion of the battery cell's capacity at 100 charge/discharge cycles (battery cell discharge capacity at the $100^{th}$ discharge cycle) relative to the discharge capacity at the first charge cycle (battery cell capacity the first time it is discharged). The "DSC shifts at delithiated state" column of table 500 represents the heat release temperature of the NMC. Thus, the heat release peak temperature (temperature at which the active NMC cathode materials produce the most heat from an exothermic phase transfer) is higher when charged to 4.3 V for the LBO-coated NMC (+23 C for 1% LBO and +28 C for 2% LBO) relative to the uncoated NMC. Thus, the LBO-coated NMC powders do not begin to release heat until they are heated to much higher temperatures than uncoated NMC powders.

When over 2% by weight LBO (2% LBO and 98% NMC by weight) was used to mix with the bare NMC, no matter the mixing method, the sintered samples agglomerated together and tended to form a more discontinuous and/or non-uniform coating. Second, the FCC/FDC and rate performance were not affected significantly after LBO coating in a low sintering temperature of 460° C. The uncoated NMC gives a FCC/FDC of 200/174 mAh/g, and the LBO-coated NMC generally gives a FCC/FDC of around 200/172 mAh/g. When the sintering temperature was increased to 850° C., the obtained FCC, FDC and the initial efficiency were all lower than that of the uncoated NMC. The powders made from the LBO-coated NMC precursor ($Ni_xMn_yCo_{1-x-y}(OH)_2$) agglomerated heavily during the slurry making process (slurry making process described above in FIG. 1), and therefore no electrochemical data is shown for these coatings in FIG. 5.

FIGS. 6A-6C show graphs 600, 650, and 675 depicting example XRD patterns from NMC powders coated with varying amount of LBO and sintered at different temperatures. The XRD patterns in FIGS. 6A-6C come from NMC powders coated in accordance with the methods described herein (e.g., the methods described above in FIGS. 1-2B). The graphs 600, 650, and 675 show how, in some embodiments, the LBO coating does not dope, protrude into, or penetrate the crystal lattice structure of the NMC to a degree that is detectable by XRD analysis. In some embodiments, however, doping may occur. For example, boron from the LBO coating may dope the NMC powder. The XRD patterns corroborate, however, that in some embodiments the LBO serves primarily as a coating only, and does not significantly disrupt, chemically react with, or otherwise change the crystal lattice structure of the NMC when it is applied as a coating according to the coating methods described herein.

Plot 602 represents XRD patterns for bare, uncoated NMC, plot 604 represents XRD patterns for NMC coated with 1% by mass LBO, and plot 606 represent XRD patterns for NMC coated with 2% by mass LBO. The measured ion intensity is provided along the vertical axis of the graphs 600, 650, and 675, and the angle of incidence of the X-ray is provided on the horizontal axis. FIG. 6A shows a first XRD graph 600 where the different samples of NMC (no LBO, 1% LBO, and 2% LBO) were sintered at 460° C. FIG. 6B shows a second XRD graph 625 where the different samples of NMC were sintered at 850° C., and FIG. 6C shows a third XRD graph 675 where a precursor of NMC, $Ni_{0.6}Mn_{0.2}Co_{0.2}(OH)_2$, was coated with the varying amounts of LBO and sintered at 850° C.

As shown in FIGS. 6A-6C, compared with the uncoated bare NMC (plot 602 in FIGS. 6A-6C), LBO-coated NMC does not produce new visible diffraction peaks or experience obvious peak-shifts under either sintering temperature, indicating that the LBO coating layer does not significantly affect the layer structure or the lattice of the NMC, although some doping is possible. Since the LBO is a kind of amorphous glass, it should not exhibit any XRD diffraction signal itself. However, when sintered at or above 850° C., the LBO-coated NMC samples show lower FCC and FDC. This reduced performance may be due to the LBO coating reacting with the surface NMC and forming some amorphous species at this high sintering temperature.

Figure 7:
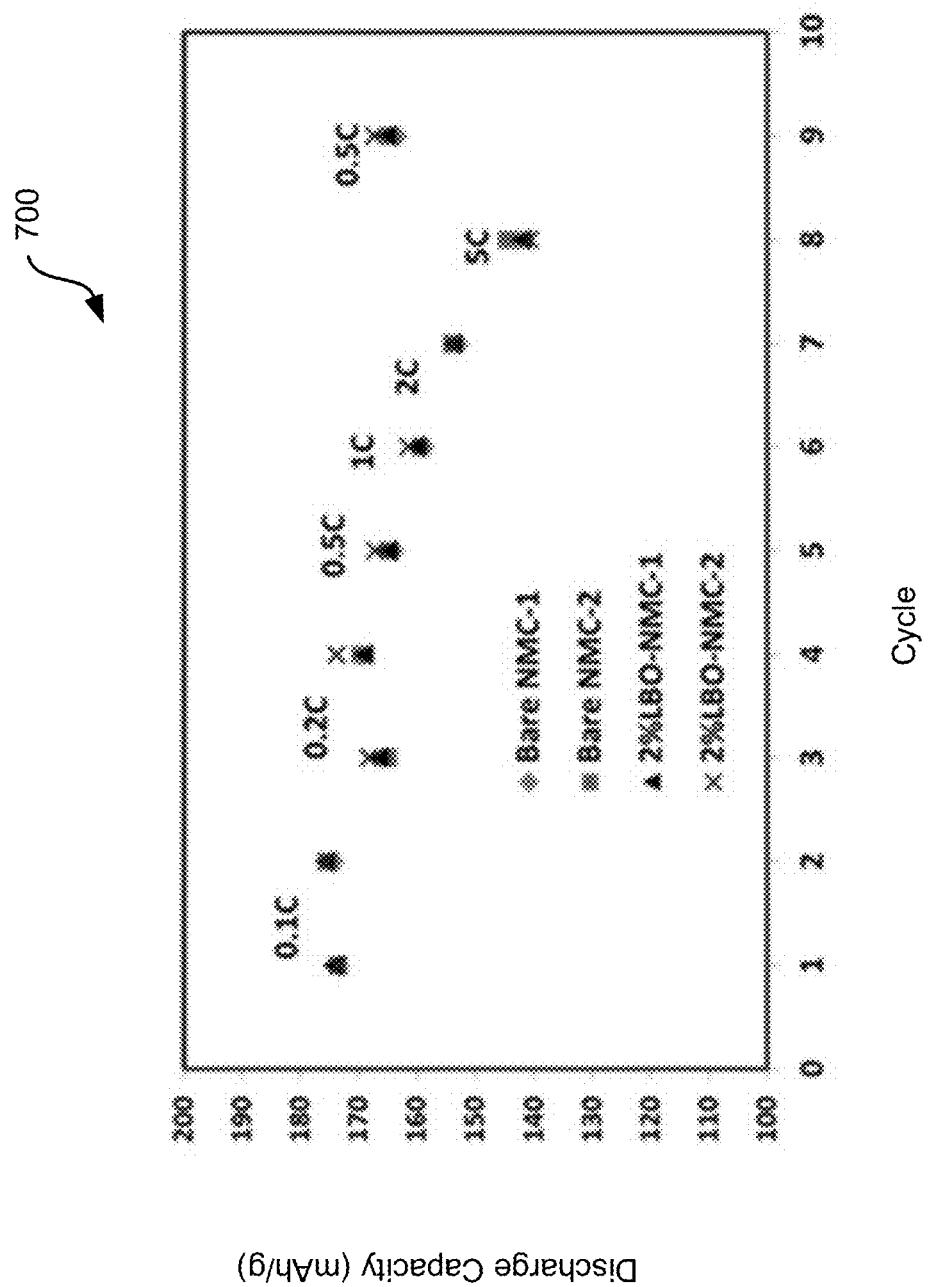
FIG. 7 shows a scatter plot of example test data reporting the measured capacity retention at various C-rates for lithium-ion cells comprising NMC cathodes with varying amounts by mass of LBO coatings, in accordance with at least one embodiment of the present disclosure.

Turning to FIG. 7, it shows a graph 700 of a scatter plot of the discharge capacity under varying C-rates of tested battery cells comprising NMC as an active cathode material and containing a 2% by weight LBO coating. In particular, 2025 type coin cells were fabricated using lithium foil as the anode and 1.0 M lithium $LiPF_6$ in a mixed EC/DEC electrolyte. The NMC composites were mixed with conductive material and PVDF (93:3:4 by weight) in NMP to prepare the cathode electrode films. Graph 700 depicts discharge capacity on the vertical axis, and charge/discharge cycle number on the horizontal axis with different C-rates.

At 0.1 C, both the coated and uncoated NMC exhibit similar capacity of around 173-174 mAh/g. When the C-rate was increased to 0.2, 0.5, 1, 2 and 5 C, the capacity of 2% LBO-coated NMC is still similar to that of the bare, uncoated NMC, which means the 2% LBO coating did not significantly affect the specific capacity in various C-rates and therefore sufficiently promotes lithium-ion and electronic transport to and from the NMC active cathode material.

Figure 8:
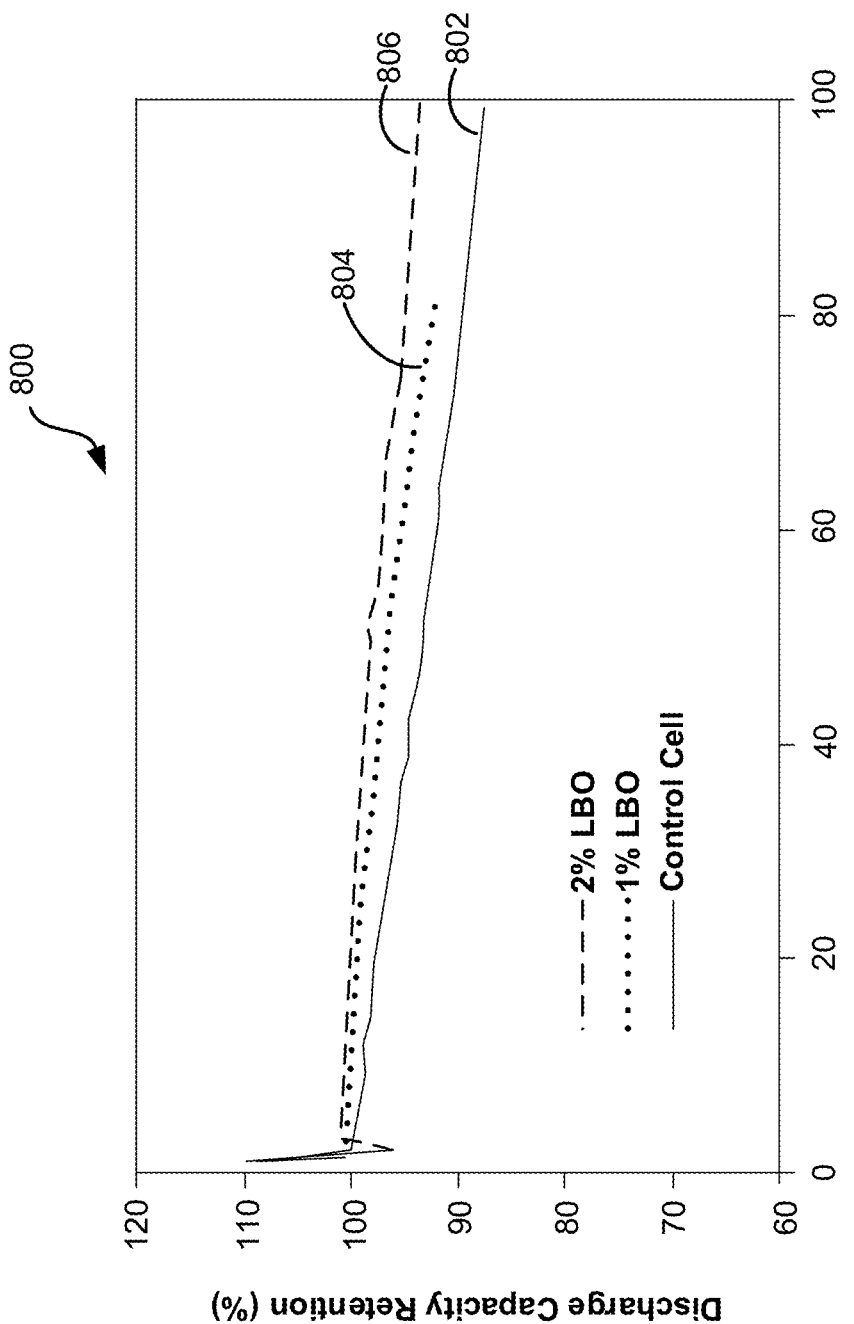
FIG. 8 shows a graph of example test data reporting the measured discharge capacity retention for lithium-ion cells comprising NMC cathodes with varying amounts by mass of LBO coatings, in accordance with at least one embodiment of the present disclosure.

Continuing to FIG. 8, it shows the cycling performance of cells similar to, or the same as, the cells whose test results were reported in graph 700 of FIG. 7, except that FIG. 8 also includes cells comprising varying amounts of LBO. In particular, FIG. 8 shows graph 800 depicting the fade (capacity retention) of battery cells, such as the battery cells tested above in the results of FIG. 7, comprising varying amounts of LBO over many charge/discharge cycles. The discharge capacity retention is reported on the vertical axis as a proportion of the discharge capacity relative to a maximum discharge capacity at a full first discharge. The number of charge/discharge cycles is provided on the horizontal axis. Plot 802 shows the performance of a cathode comprising bare NMC that is not coated with LBO, plot 804 shows the performance of a cathode comprising a 1% by weight coating of LBO, and plot 806 shows the performance of a cathode comprising a 2% by weight coating of LBO.

As shown in FIG. 8, the 2% by weight LBO-coated NMC composite (plot 806) exhibits the highest capacity retention, followed by the 1% by weight LBO-coated NMC (plot 804), and then the uncoated bare NMC (plot 802). After 80 cycles, the capacity retentions of 1% by weight LBO and 2% by weight LBO-coated NMC are around 92.3% and 95.2% respectively. On the contrary, the uncoated bare NMC delivers a capacity retention of around 90.1% after 80 cycles. The 1% by weight LBO-coated NMC composite shows diminished cycling stability when compared to the 2% by weight LBO-coated NMC, but much better than that of the uncoated bare NMC. The improved cycling performance after the LBO coating demonstrates the critical role of LBO coating in helping to form a more stable SEI layer on the surface of NMC particles and mitigating the continuous reaction between NMC particles with liquid electrolytes that results in both a decrease in electrochemical performance of the cell and increased safety risks. These behaviors of LBO-coated NMC in the tested coin cells were consistent with the DSC curves shown and described below in FIG. 9

Figure 9:
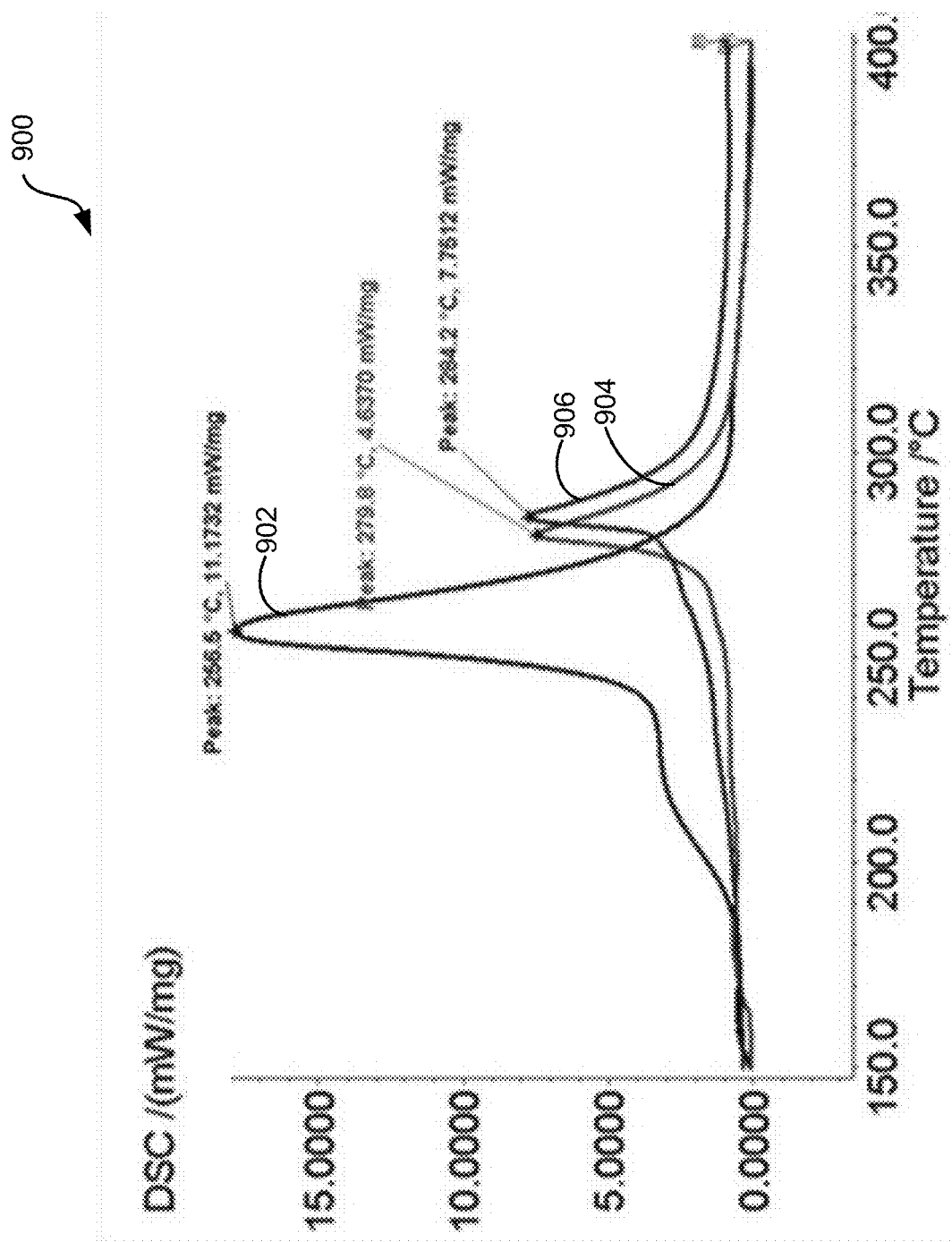
FIG. 9 shows a Differential Scanning calorimetry (DSC) curve for lithium-ion cells comprising NMC cathodes with varying amount by mass of LBO coatings, in accordance with at least one embodiment of the present disclosure.

Turning to FIG. 9, it shows example differential scanning calorimetry (DSC) curves for cathodes of the disassembled coin (half) cells whose tests results are shown and described above in FIGS. 7 and 8. In particular, after charging the NMC/Li-metal half cells to 4.3V, the cells were disassembled and cathodes were recovered for DSC testing in this delithiated state and with the presence of organic electrolyte. Plot 902 shows the DSC curve for cathodes comprising uncoated, de-lithiated NMC as their cathode active material, plot 904 shows the DSC curve for cathodes comprising NMC comprising a 1% by weight LBO coating as their cathode active material, and plot 906 shows the DSC curve for cathodes comprising NMC comprising a 2% by weight LBO coating as their cathode active material.

For the coated samples (plots 904 and 906), it is clear that both the onset temperature and peak temperature of the exothermal process is greater than that of the uncoated samples (plot 902) by more than 20° C., indicating that the thermal stability for LBO-coated NMC materials in their charged state is higher than for uncoated NMC materials. This is important because the charged state (high oxidation state of NMC cathode) is the highest reactive state and also the most prone to combustion/fire. Therefore, the exothermal reaction temperature of charged NMC cathode materials is increased by coating the NMC materials with LBO. As summarized in table 500 of FIG. 5, the 1% by weight and 2% by weight LBO-coated NMC cathode active materials have heat release temperatures of 23° C. and 28° C., respectively, higher than uncoated NMC materials. Although plots 904 and 906 of the coated samples show heat release peak temperatures of 279.8° C. and 284.2° C. respectively, in some embodiments the heat release peak temperatures of LBO-coated NMC materials may be lower. For example, as non-limiting examples, heat release peak temperatures of LBO-coated NMC materials may be 150° C. or 180° C.

Moving on to FIGS. 10-14, they provide data, results, and images as relates to NMC active material coated with a compound comprising lithium, aluminum, boron, and oxygen (LABO). LABO may comprise amorphous LBO comprising deposits of crystalline $Al_2O_3$. The crystalline deposits may be substantially uniform in concentration throughout the LABO coating. The crystalline deposits may be of such small size or infrequency that they do not interfere with a continuous coating provided by the amorphous LBO material.

Figure 10:
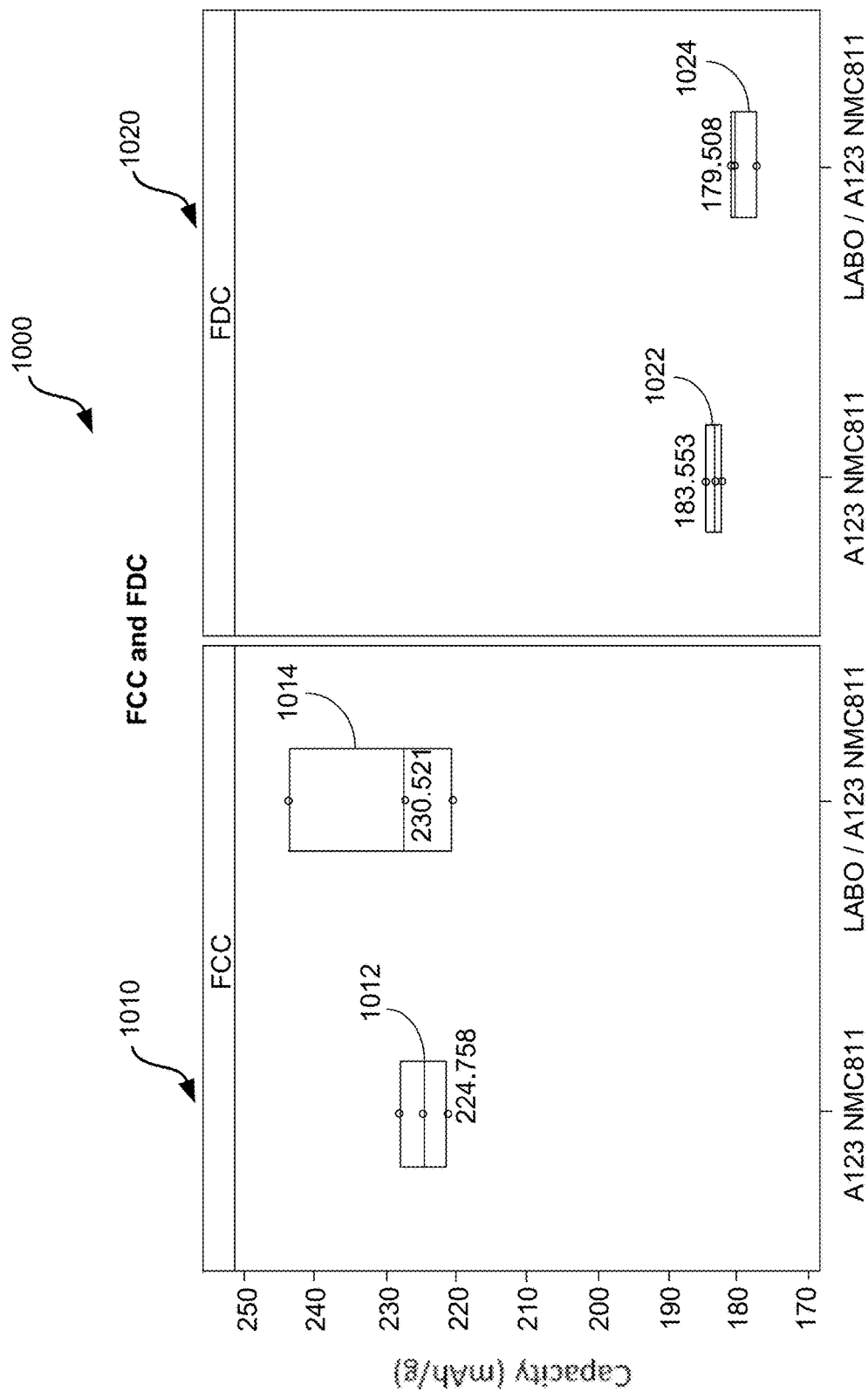
FIG. 10 shows a graph of first charge capacity (FCC) and first discharge capacity (FDC) for uncoated NMC811 and for NMC811 coated with a compound containing lithium, aluminum, boron, and oxygen (LABO) in accordance with at least one embodiment of the present disclosure.

Turning to FIG. 10, a graph 1000 is provided which shows, at 1010, the first charge capacities (FCC) of uncoated NMC811 and LABO-coated NMC811 with 1% by weight of LABO coating. The FCC of the uncoated NMC811 is shown at 1012 and shows a value of 224.758 mAh/g. The FCC of the LABO-coated NMC811 is shown at 1014 and shows a value of 230.521 mAh/g. It can thus be seen that the LABO-coated NMC811 has a higher FCC than the uncoated NMC811. The first discharge capacities (FDC) of uncoated NMC811 and LABO-coated NMC811 are shown at 1020. The FDC of the uncoated NMC811 is shown specifically at 1022 and shows a value of 183.553 mAh/g. The FDC of the LABO-coated NMC811 is shown at 1024 and shows a value of 179.508 mAh/g.

Figure 11:
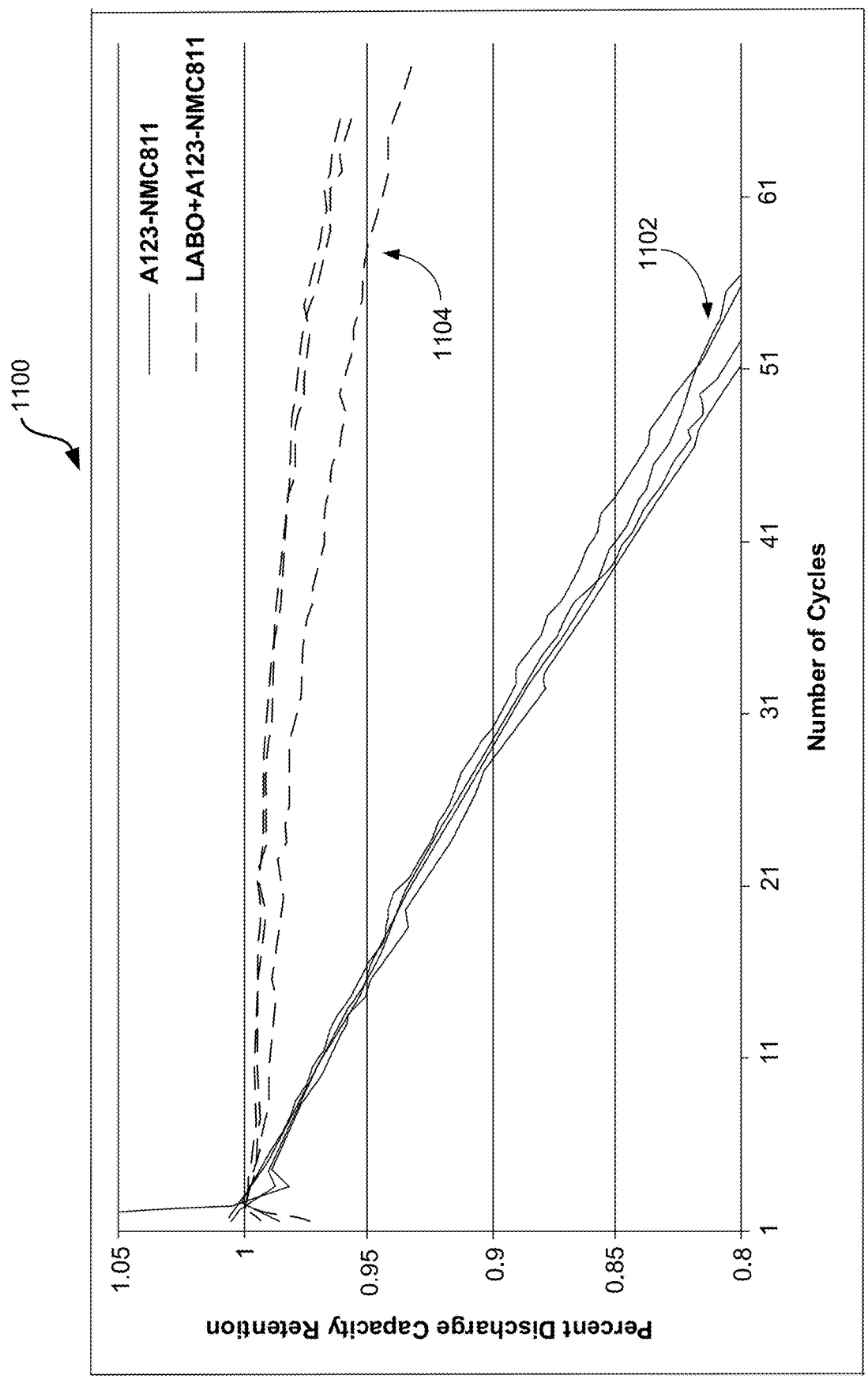
FIG. 11 shows a graph of Percent Discharge Capacity Retention vs. Number of Cycles for uncoated NMC811 and for NMC811 coated with LABO in accordance with at least one embodiment of the present disclosure.

Turning now to FIG. 11, a graph 1100 is provided which shows multiple curves for Percent Discharge Capacity Retention (PDCR) vs. Number of Cycles for uncoated NMC811 and LABO-coated NMC811. The curves for uncoated NMC811 are shown at 1102 while the curves for LABO-coated NMC811 are shown at 1104. As can be seen, in repeated trials, the LABO-coated NMC811 shows significantly higher PDCR vs. Number of Cycles compared to repeated trials of uncoated NMC811. For example, after 51 cycles, the LABO-coated NMC811 was above 95% discharge capacity retention while the uncoated NMC811 was below 85% discharge capacity retention. The improved cycling performance after the LABO coating demonstrates that LABO coating helps to form a more stable SEI layer on the surface of NMC particles and mitigates the continuous reaction between NMC particles with liquid electrolytes that results in both a decrease in electrochemical performance of the cell and increased safety risks.

Figure 12:
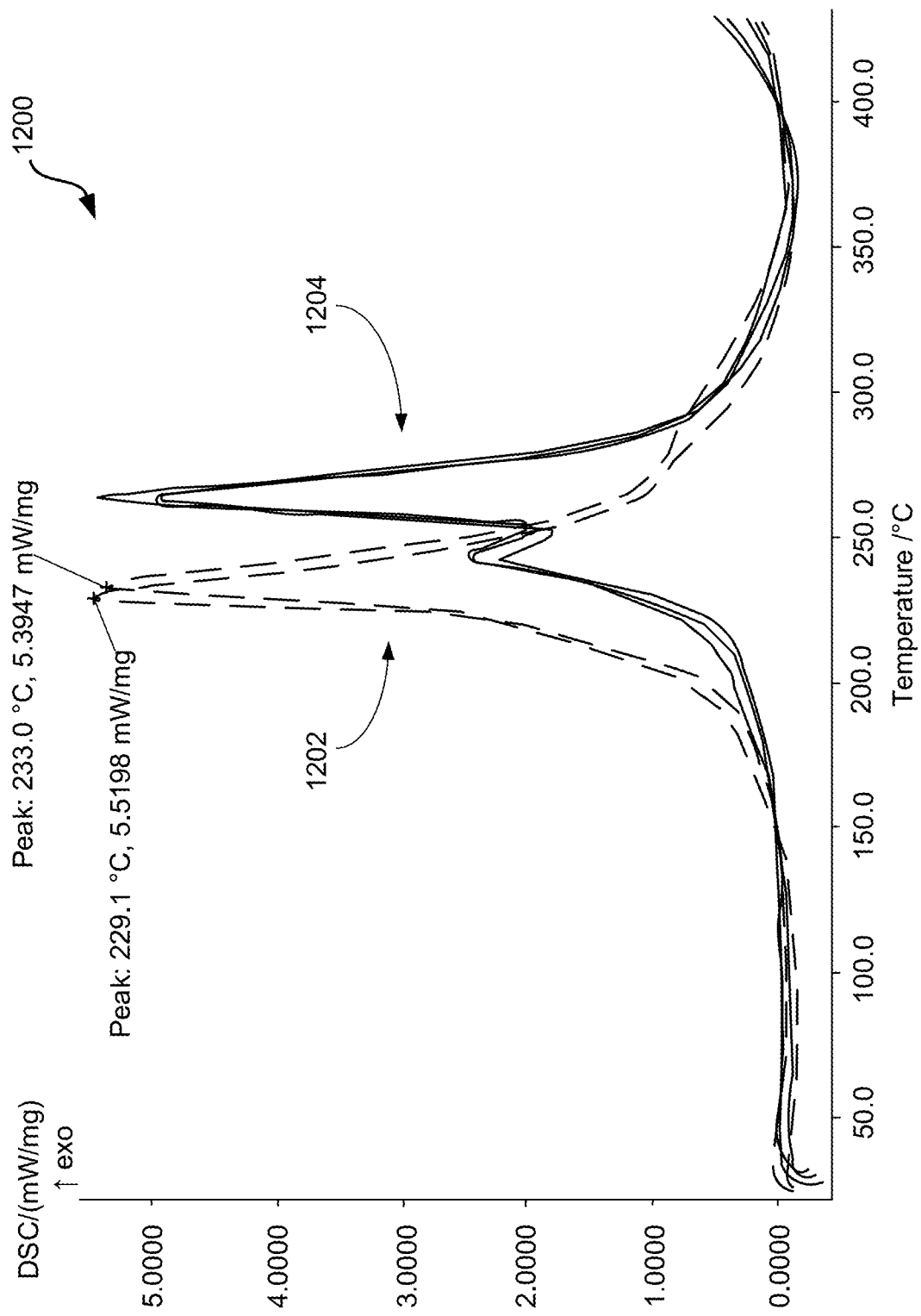
FIG. 12 shows a Differential Scanning calorimetry (DSC) curve for lithium-ion cells comprising NMC811 and comprising NMC811 coated with LABO in accordance with at least one embodiment of the present disclosure.

Turning to FIG. 12, it shows a plotting 1200 of example differential scanning calorimetry (DSC) curves for cathodes of disassembled coin (half) cells. In particular, after charging the NMC/Li-metal half cells to 4.3V, the cells were disassembled and electrodes were recovered for DSC testing in this charged state and with the presence of organic electrolyte. Set of plots 1202 shows the DSC curve for cathodes comprising uncoated, de-lithiated NMC811 as their cathode active material, and set of plots 1204 shows the DSC curve for cathodes comprising NMC811 comprising a 1.1% by weight LABO coating as their cathode active material.

For the 1.1 wt % (1.1 wt % LABO and 98.9 wt % NMC) LABO-coated sample (set of plots 1204), it is clear that both the onset temperature and peak temperature of the exothermal process is greater than that of the uncoated samples (set of plots 1202). In particular, the peak temperature of the LABO-coated sample (plots 1204) is more than 30° C. higher than the peak temperature of the uncoated NMC811, indicating that the thermal stability for LABO-coated NMC materials in their charged state is higher than for uncoated NMC materials. This is important because the charged state (high oxidation state of NMC cathode) is the highest reactive state and also the most prone to combustion/fire. Therefore, the exothermal reaction temperature of charged NMC cathode materials is increased by coating the NMC materials with 1.1 wt % LABO. Although the set of plots 1204 of the coated samples show heat release peak temperatures of 229.1° C. and 263.6° C., in some embodiments the heat release peak temperatures of LABO-coated NMC materials may be lower. For example, as non-limiting examples, heat release peak temperatures of LABO-coated NMC materials may be 150° C. or 180° C.

Figure 13:
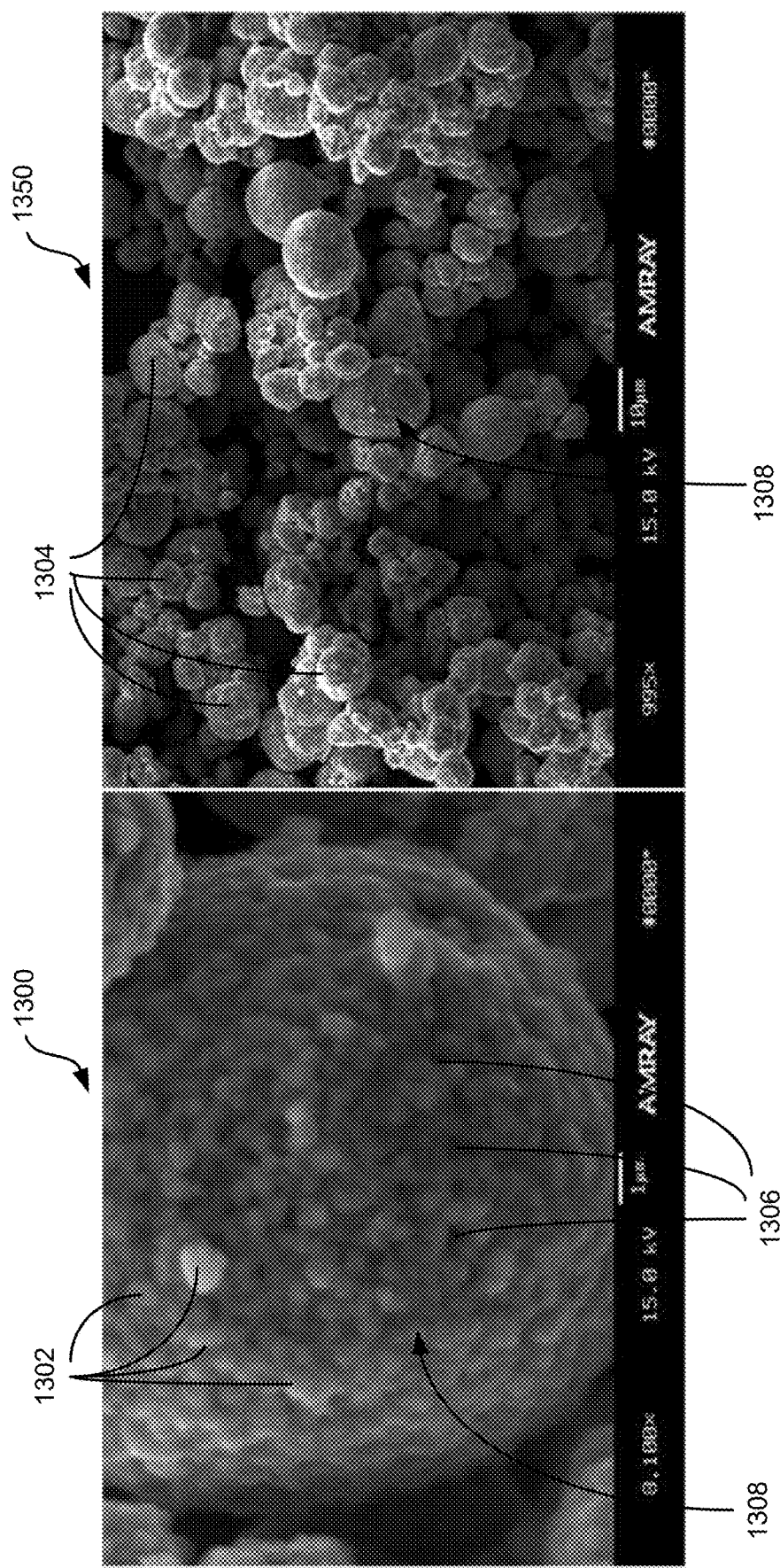
FIG. 13 shows a scanning electron microscope (SEM) image of an example LABO-coated NMC sample, in accordance with at least one embodiment of the present disclosure.

Moving on to FIG. 13, it shows SEM images of example NMC cathode materials. Image 1350 shows 1% LABO-coated NMC particles under 995× magnification. Image 1300 shows LABO-coated NMC particles under higher magnification (8,100×). The LABO-coated NMC particles were coated in accordance with the coating methods described herein. As can be seen in FIG. 13, the NMC samples comprise a plurality of secondary particles 1304, each of the secondary particles 1304 comprising a plurality of primary particles 1302. In the second SEM image 1350, on the right of FIG. 13, one secondary particle 1308 is labelled because this same particle is shown in the more magnified first SEM image 1300 to the left of FIG. 13.

As shown in images 1300 and 1350 of FIG. 13, LABO can continuously and uniformly coat the surface of the secondary particle 1308 when coated on the NMC according to one or more of the methods described herein. Thus as shown in FIG. 13, by utilizing LABO and one or more of the coating methods described herein, the entire surface of the secondary particles 1304 of the NMC is coated with a continuous and/or uniform layer of LABO. Further, the LABO fills in the pores 1306 (equivalent to the pores 306 shown in FIG. 3A) as evidenced by the smoother surface of the secondary particles 1304 in FIG. 13 relative to the surfaces of the uncoated secondary particles of FIG. 3A. Thus in FIG. 13, the pores are difficult to even make out because the LABO has so evenly and continuously filled the pores 1306.

Figure 14:
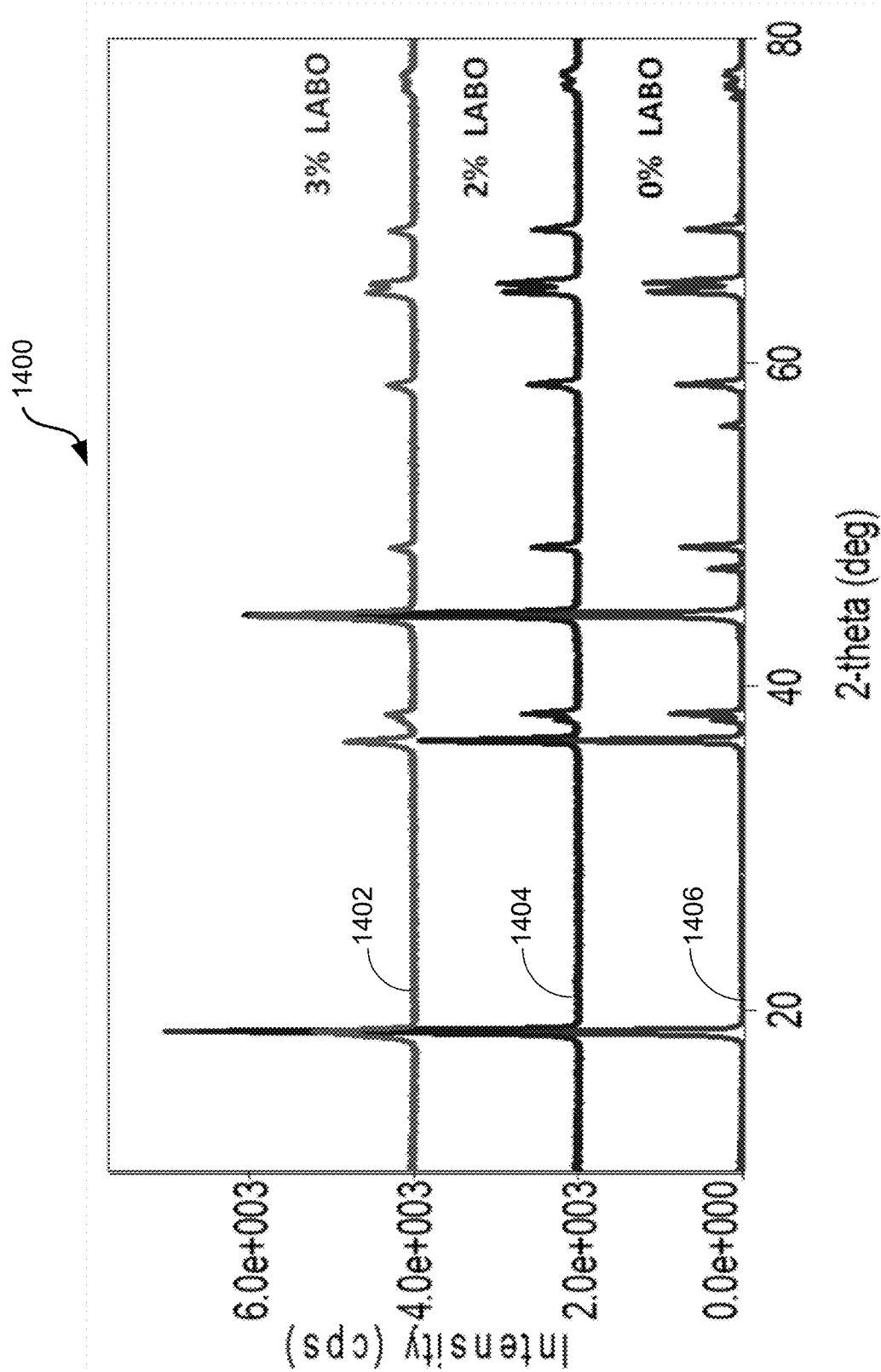
FIG. 14 shows a graph depicting X-Ray Diffraction (XRD) patterns from example precursor NMC samples having varying amounts by mass of LABO coatings and sintered at 850° C., in accordance with at least one embodiment of the present disclosure.

FIG. 14 shows graph 1400 depicting example XRD patterns from NMC powders coated with varying amounts of LABO. The XRD patterns in FIG. 14 come from NMC powders coated in accordance with the methods described herein (e.g., the methods described above in FIGS. 1-2B). Plot 1406 represents XRD patterns for bare, uncoated NMC, plot 1404 represents XRD patterns for NMC coated with 2% by mass LABO, and plot 1402 represent XRD patterns for NMC coated with 3% by mass LABO. The measured intensity is provided along the vertical axis of graph 1400, and the angle of incidence of the X-ray is provided on the horizontal axis.

As shown in FIG. 14, compared with the uncoated bare NMC (plot 1406), LABO-coated NMC does not produce new visible diffraction peaks or experience obvious peak-shifts, indicating that the LABO coating layer does not significantly affect the layer structure or the lattice of the NMC. Since the LABO is primarily a kind of amorphous glass, it should not exhibit significant XRD diffraction signal itself. Graph 1400 thus shows that, in some embodiments, the LABO coating does not significantly dope, protrude into, or penetrate the crystal lattice structure of the NMC. Therefore, the XRD patterns corroborate that the LABO serves primarily as a coating only, and does not significantly disrupt, chemically react with, or otherwise change the crystal lattice structure of the NMC when it is applied as a coating according to the coating methods described herein. In some embodiments, however, doping of the NMC material by constituents of the LABO coating may occur. For example, boron or aluminum from the LABO coating may dope the NMC material. In some embodiments, doping of the NMC material by constituents of the LABO coating may occur, and the one or more dopants may only penetrate from 0 to 30% of the distance from the surface of the NMC particle to the center of the NMC particle.

In this way, a safer, longer-lasting battery is achieved by utilizing LBO as a coating for the cathode active material of the battery. In particular, because LBO is water soluble, LBO may be dissolved in a liquid solution that ensures more even and complete deposition of the LBO on the secondary particles of the cathode active material during the mixing process as opposed to methods where the coating is in dry, powder form, and is dry-mixed with the active cathode material. Further, because the LBO comprises a type of amorphous glass, unlike the crystalline structure of inorganic oxide nano-particles, it has a lower grain boundary resistance than the inorganic oxide nano-particles, and therefore spreads more easily, evenly, and continuously over the surface of the secondary particles of the cathode active material.

As such, the resulting LBO coating may comprise a more continuous and even coating than coatings comprising inorganic oxide nano-particles. In creating this more uniform and continuous coating, a technical effect of increasing the cycling stability (reducing fade) of a battery cell is achieved because the LBO coating reduces decomposition of the electrolyte by the active cathode material as compared to the inorganic oxide coatings. Because the LBO coating also helps to form a more stable SEI layer on the surface of the active cathode material (by interacting with the products of electrolyte decomposition), the decomposition of the electrolyte is further reduced, thereby further improving cycling performance of the battery cell.

Further, a technical effect of increasing battery safety and reducing battery fire is achieved by coating the active cathode materials of the cathode of the battery cell with LBO, since the LBO coating increases the flash point of the electrolyte. In particular, the LBO coating minimizes electrolyte decomposition, and therefore reduces gas production that would lower the flash point of the electrolyte. Thus, the heat release temperatures of cathodes containing the LBO coating are increased.

Another technical effect of reducing cost is achieved by utilizing the LBO as coating for the active cathode material instead of inorganic oxides because the LBO does not need to be ground as evenly as the inorganic oxide nano-particles, and does not require the high energy mixers that the inorganic oxide nano-particles require to mix with the active cathode materials.

A further technical effect of reducing environmental waste is achieved by utilizing the LBO as a coating for the active cathode material instead of inorganic oxides because the LBO, when dissolved in a solution, produces far less dust than the grinding required to make the inorganic oxide nano-particles ready for mixing with the active cathode materials, and by the actual mixing techniques required to mix the inorganic oxide nano-particles with the active cathode materials.

In one example, a coating or coating precursor for an active cathode material of an electrode of a battery cell may include an amorphous glass including lithium, boron, and oxygen. Optionally, the coating or coating precursor may include at least one of lithium tetraborate (LBO), lithium fluoride mixed LBO, lithium metaborate, lithium orthoborate, or another lithium salt.

In another example, a method may include dissolving a coating or coating precursor including an amorphous glass including lithium, boron, and oxygen, for an electrochemically active cathode material, in a solvent to form a coating solution, mixing the coating solution with the electrochemically active cathode material, and sintering the lithium boron compound and the electrochemically active cathode material. Optionally, the lithium boron compound may include at least one of lithium tetraborate (LBO), lithium fluoride mixed LBO, lithium metaborate, lithium multiborate, lithium orthoborate, or another lithium salt.

Various modifications of the present invention, in addition to those shown and described herein, will be apparent to those skilled in the art of the above description. Such modifications are also intended to fall within the scope of the appended claims. The foregoing description is illustrative of particular embodiments of the invention, but is not meant to be a limitation upon the practice thereof. The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims. The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A coating adhered to an active electrode material of an electrode of a battery cell to form a coated active electrode material, the coating comprising an amorphous glass comprising lithium, boron, and oxygen,
wherein the electrode is a cathode, wherein the active electrode material is an active cathode material, and wherein the coating is adhered to the active cathode material and fills pores of secondary particles of the active cathode material to increase a flash point of an electrolyte of the battery cell, and
wherein the active electrode material comprises NMC precursor $Ni_xMn_yCo_{1-x-y}(OH)_2$.

2. The coating of claim 1, wherein the coating comprises at least one of lithium tetraborate (LBO), lithium fluoride mixed LBO, lithium metaborate, lithium multiborate, or lithium orthoborate.

3. The coating of claim 1, wherein the coating further comprises $Li_aX_bB_cO_d$, wherein X is one or more of Al, Ti, Ca, Si, W, and Nb, and wherein $0 \leq a \leq 10$, $0 \leq b \leq 10$, $0 \leq c \leq 10$, and $0 \leq d \leq 10$.

4. The coating of claim 1, wherein the electrode is a lithium insertion cathode, and wherein the active electrode material further comprises one or more of lithium iron phosphate, spinel and layered structure lithium nickel manganese oxide, and any one or more of their precursors.

5. The coating of claim 1, wherein the secondary particles are porous, and the coating continuously coats pores of the secondary particles such that the coating reduces a size of the pores relative to the same active electrode material lacking the coating.

6. The coating of claim 1, wherein the coating helps to form a solid electrolyte interface (SEI) layer on a surface of the coated active electrode material, the SEI being formed by the coating interacting with products formed from decomposition of an organic electrolyte.

7. The coating of claim 1, wherein the coating is formed by sintering a coating precursor to the active electrode material.

8. The coating of claim 1, wherein the coating is 0.01 to 100% $Li_aX_bB_cO_d$, wherein X is one or more of Al, Ti, Ca, Si, W, and Nb, wherein $0 \leq a \leq 10$, $0 \leq b \leq 10$, $0 \leq c \leq 10$, and $0 \leq d \leq 10$, and wherein $Li_aX_bB_cO_d$ is an electroneutral compound or a lithium metal borate compound.

9. The coating of claim 8, wherein the $Li_aX_bB_cO_d$ comprises LBO comprising deposits of oxides of one or more of aluminum, titanium, calcium, silicon, tungsten, and niobium.

10. The coating of claim 1, wherein the active electrode material further comprises NMC.

11. The coating of claim 1, wherein the active electrode material further comprises a lithium component.

12. A battery cell comprising a coated electrochemically active electrode material, the coated electrochemically active electrode material comprising an electrochemically active electrode material coated with an amorphous glass comprising lithium, boron, and oxygen,
wherein the electrochemically active electrode material is an active cathode material, and wherein the amorphous glass coating is adhered to the active cathode material and fills pores of secondary particles of the active cathode material to increase a flash point of an electrolyte of the battery cell, the coating continuously provided over an entire surface of the secondary particles, and
wherein the electrochemically active electrode material comprises NMC precursor $Ni_xMn_yCo_{1-x-y}(OH)_2$.

13. The battery cell of claim 12, wherein the coated electrochemically active electrode material is mixed with a non-coated electrode material.

14. The battery cell of claim 12, wherein the coating is 0.1-20.0% of the coated electrochemically active electrode material by weight.

15. The battery cell of claim 12, wherein the electrochemically active electrode material is homogenously dry mixed with the amorphous glass comprising lithium, boron, and oxygen coating.

16. The battery cell of claim 12, wherein the coating is 0.01 to 100% $Li_aX_bB_cO_d$, wherein X is one or more of Al, Ti, Ca, Si, W, and Nb, and wherein $0 \leq a \leq 10$, $0 \leq b \leq 10$, $0 \leq c \leq 10$, and $0 \leq d \leq 10$.

17. A coating adhered to an active electrode material of an electrode of a battery cell to form a coated active electrode material, the coating comprising an amorphous glass comprising lithium, boron, and oxygen,
wherein the electrode is a cathode, wherein the active electrode material is an active cathode material, and wherein the coating is adhered to the active cathode material and fills pores of secondary particles of the active cathode material to increase a flash point of an electrolyte of the battery cell,
wherein the active electrode material comprises precursor $Ni_xMn_yCo_{1-x-y}(OH)_2$, and
wherein the coating is substantially uniform such that the coating is approximately a same thickness around an entire surface of the secondary particles.

18. The coating of claim 17, wherein the pores are gaps between adjacent primary particles of the secondary particles.

19. The coating of claim 17, wherein the coating further comprises lithium metaborate, lithium multiborate, or lithium ortho-borate.

20. The coating of claim 17, wherein the coating is 0.5 to 90% $Li_aX_bB_cO_d$, wherein X is one or more of Al, Ti, Ca, Si, W, and Nb, and wherein $0 \leq a \leq 10$, $0 \leq b \leq 10$, $0 \leq c \leq 10$, and $0 \leq d \leq 10$.

\* \* \* \* \*